(12) United States Patent
Walsh

(10) Patent No.: US 7,782,904 B2
(45) Date of Patent: Aug. 24, 2010

(54) METHODS, SYSTEMS, AND PRODUCTS FOR CONDENSING MESSAGES

(75) Inventor: Richard Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 833 days.

(21) Appl. No.: 11/323,710

(22) Filed: Dec. 30, 2005

(65) Prior Publication Data

US 2007/0153832 A1 Jul. 5, 2007

(51) Int. Cl.
*H04J 3/12* (2006.01)
(52) U.S. Cl. .................. 370/474; 370/389
(58) Field of Classification Search ........... 370/474, 370/389
See application file for complete search history.

(56) References Cited

U.S. PATENT DOCUMENTS

| | | | | |
|---|---|---|---|---|
| 6,032,197 | A * | 2/2000 | Birdwell et al. ............. | 709/247 |
| 6,397,259 | B1 * | 5/2002 | Lincke et al. ............... | 709/236 |
| 6,950,445 | B2 | 9/2005 | Svanbro et al. | |
| 6,954,801 | B1 * | 10/2005 | Housel ........................ | 709/247 |
| 7,120,666 | B2 * | 10/2006 | McCanne et al. .......... | 709/203 |
| 2002/0059463 | A1 * | 5/2002 | Goldstein .................... | 709/247 |
| 2002/0129167 | A1 * | 9/2002 | Kanai et al. .................. | 709/247 |
| 2002/0129168 | A1 * | 9/2002 | Kanai et al. .................. | 709/247 |
| 2003/0009567 | A1 | 1/2003 | Farouk | |
| 2004/0215757 | A1 | 10/2004 | Butler | |
| 2004/0246966 | A1 | 12/2004 | Wu et al. | |
| 2004/0254905 | A1 * | 12/2004 | Tiku ............................ | 706/55 |
| 2004/0267900 | A1 | 12/2004 | Hoekstra et al. | |
| 2005/0055464 | A1 * | 3/2005 | Weller ......................... | 709/247 |
| 2005/0096016 | A1 * | 5/2005 | Tervo et al. ............... | 455/414.1 |
| 2005/0160184 | A1 * | 7/2005 | Walsh et al. ................ | 709/247 |
| 2006/0101417 | A1 * | 5/2006 | Hoh ............................ | 717/130 |
| 2007/0153832 | A1 * | 7/2007 | Walsh ......................... | 370/474 |

FOREIGN PATENT DOCUMENTS

WO 2005/104586 A1 11/2005

OTHER PUBLICATIONS

International Search Report and Written Opinion for PCT/US2006/62538.

* cited by examiner

*Primary Examiner*—Ricky Ngo
*Assistant Examiner*—Ben H Liu
(74) *Attorney, Agent, or Firm*—Withrow & Terranova, PLLC

(57) ABSTRACT

Methods, systems, and products are disclosed for condensing a message. The message is processed, and a portion of a header is removed. The removed portion is stored in memory. A reference is inserted into the header, and the reference references the stored portion. Because the reference replaces the removed portion, the message is condensed.

12 Claims, 25 Drawing Sheets

METHODS, SYSTEMS, AND PRODUCTS FOR CONDENSING MESSAGES

BACKGROUND

This application particularly relates to condensing messages for more efficient transfer over communications networks.

Bandwidth is a consideration in the communications industry. As communications customers demand more and more content and features, these demands challenge existing network infrastructures. The communications and computer industries, therefore, are hard at work identifying new ways of increasing bandwidth to meet these challenges.

CC/PP information provides an example. The Composite Capabilities/Preference Profiles (or CC/PP) outlines a structure and a vocabulary for describing the capabilities and user preferences of a communications device. This CC/PP information has many uses, yet the CC/PP information may be used to adapt content to the user's communications device. Because content may be adapted to the device, the content is tailored to more efficiently utilize bandwidth.

This CC/PP information, however, can be verbose. While the CC/PP information helps efficiently utilize bandwidth, the CC/PP information itself consumes precious bandwidth. Now, the bandwidth consumed by the CC/PP information is small when compared to most content. Still, however, the CC/PP information adds overhead to the transfer of messages over communications networks. What is needed, then, are methods, systems, and products that further condense messages for more efficient transfer over communications networks.

SUMMARY

The aforementioned problems, and other problems, are reduced, according to exemplary embodiments, using methods, systems, and products that condense messages. The exemplary embodiments of the present invention remove one or more portions of a message and replace those removed portions with a reference. The removed portions are stored in memory, and the reference points to that memory location. The message, for example, may be condensed by replacing portions and/or repetitive information with a shorter and/or smaller Uniform Resource Indicator. The Uniform Resource Locator provides a reference to the removed portion(s). The condensed message, then, may be efficiently transmitted to a destination using less bandwidth. The destination need only then query for the removed portions. Once the destination queries for and obtains the removed portions, the destination may cache the removed portions for future access.

The exemplary embodiments include methods, systems, and products for condensing a message. The message, having a header, is processed. A portion of the header is removed and stored in memory. A reference to the stored portion is inserted into the header. The reference replaces the removed portion, thus condensing the message.

In another of the embodiments, a system condenses a message. The system has an agent application stored in memory, and a processor communicates with the memory. The processor processes the message and removes a portion of a header. The processor stores the removed portion in memory. The processor inserts a reference into the header, with the reference referencing the stored portion. The reference replaces the removed portion, thus condensing the message.

In yet another embodiment, a computer program product condenses a message. The computer program product comprises a computer-readable medium storing processor-executable instructions. These instructions cause the processor to remove a portion of a header. The processor stores the removed portion in memory. The processor inserts a reference into the header, with the reference referencing the stored portion. The reference replaces the removed portion, thus condensing the message.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future.

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. These functions may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Figure 1:
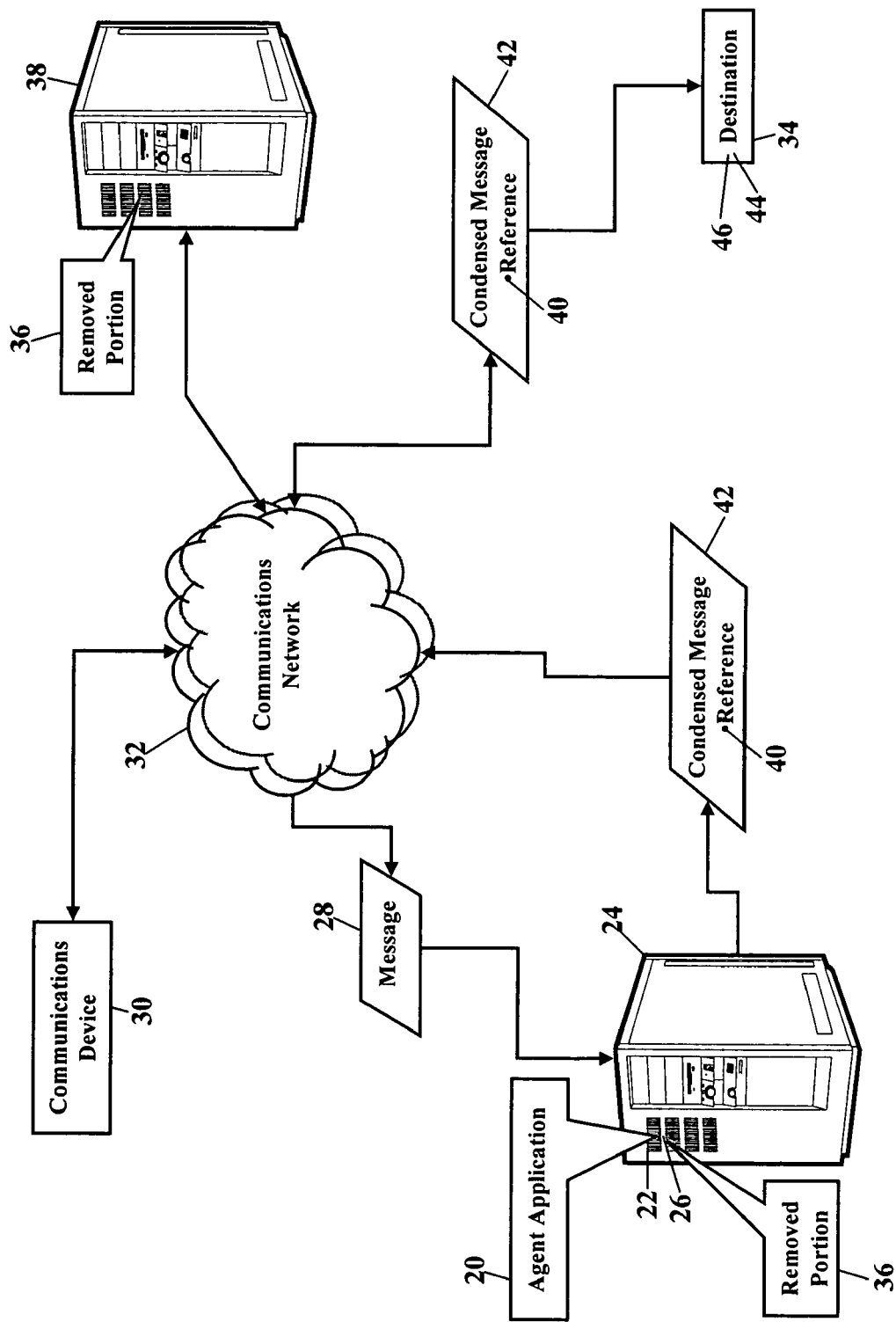
FIG. 1 is a schematic illustrating an agent application, according to the present invention.

FIG. 1 is a schematic illustrating an agent application 20, according to the present invention. The agent application 20 is a set of processor-executable instructions that are stored in memory 22 of a computer 24. A processor 26 communicates with the memory 22 and executes the instructions represented by the agent application 20. The computer 24 receives a message 28 from a communications device 30. The message 28 is communicated via a communications network 32. As the following paragraphs explain, the agent application 20 causes the processor 26 to condense the message 28. Because the message 28 is condensed, the message 28 is more efficiently sent, transmitted, or communicated to a destination 34.

The processor 26 removes one or more portions of the message 28. As the processor 26 processes the message 28, the processor 26 removes a portion 36 of the message 28. The processor 26 stores the removed portion 36 in local memory (such as the memory 22). The processor 26, additionally or alternatively, may remotely store the removed portion 36 in a remote memory location 38 via the communications network 32. The agent application 20 causes the processor 26 to replace the removed portion 36 with a reference 40. The reference 40 may be a Uniform Resource Indicator (URI) (or sometimes termed a Uniform Resource Locator (URL)) or other link or reference to the memory location where the removed portion 36 is stored. Because the reference 40 replaces the removed portion 36, the reference 40 may consume less bits/bytes than the removed portion 36. The processor 26 thus shortens the message 28 and produces a condensed message 42. The condensed message 42 is then more quickly communicated via the communications network 32 to the destination 34.

The destination 34 may also more efficiently process the condensed message 42. As the condensed message 42 is processed, a destination processor 44 determines whether the information represented by the reference 40 has already been stored in destination memory 46 (e.g., cache memory). If the information represented by the reference 40 is not found in the destination memory 46, then the destination processor 44 queries for and stores that information. When, however, the information represented by the reference 40 is found in the destination memory 46, the destination processor 44 may quickly retrieve that information and continue processing. That is, because the information represented by the reference 40 was already stored in the destination memory 46, the destination processor 44 need not process a query for that information. The reference 40, then, is especially useful in reducing processing of redundant message portions.

Figure 2:
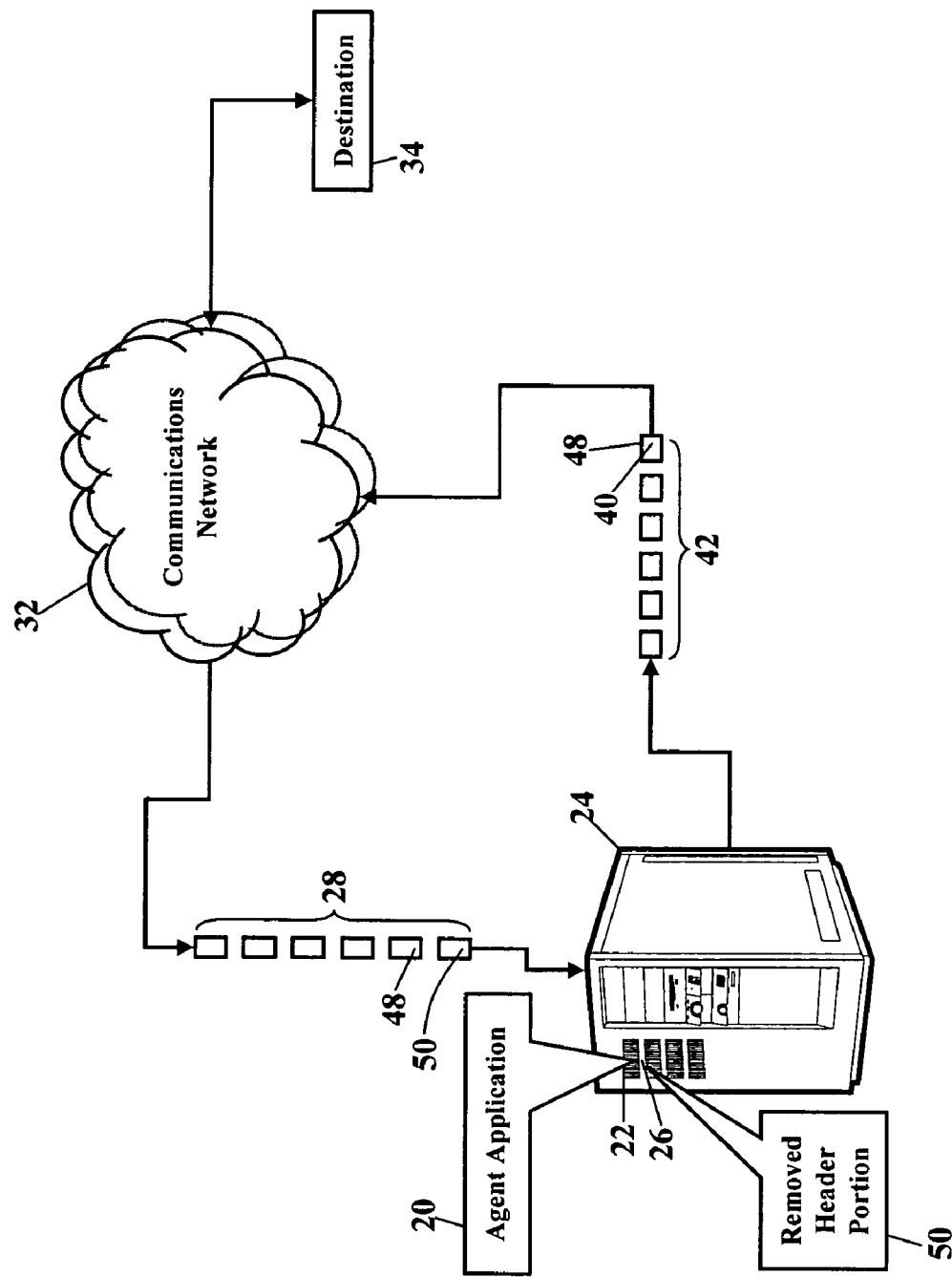
FIG. 2 is a schematic illustrating the condensing of messages, according to the present invention.

FIG. 2 is a schematic further illustrating the condensing of messages, according to the present invention. The computer 24 again receives the message 28, and the agent application 20 causes the processor 26 to condense the message 28. Here, however, the message 28 may be packetized according to a packet protocol, such that the message 28 comprises one or more headers 48. The agent application 20 causes the processor 26 to remove at least a header portion 50 of at least one of the headers 48. That removed header portion 50 is stored in local memory (such as the memory 22) and/or at the remote memory location (shown as reference numeral 38 in FIG. 1). The agent application 20 causes the processor 26 to replace the removed header portion 50 with the reference 40. The reference 40 may be any designation or notation that references the memory location where the removed header portion 50 is stored. Because the reference 40 replaces the removed header portion 50, the processor 26 thus produces the condensed message 42. The condensed message 42 is then more quickly communicated via the communications network 32 to the destination 34.

Any packet protocol is suitable for this invention. As those of ordinary skill in the art understand, sometimes network and computer information is packetized (or "framed") for use in packet networks. The information is grouped into packets according to a packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Because some networks are "mixed"—that is, the network receives and handles packets of differing protocols, a "translator" determines the particular packet protocol and the appropriate destination for each packet. Because the basics of packetizing and packet protocols are well-known, this specification will not further explain packetized messages.

Figure 3:
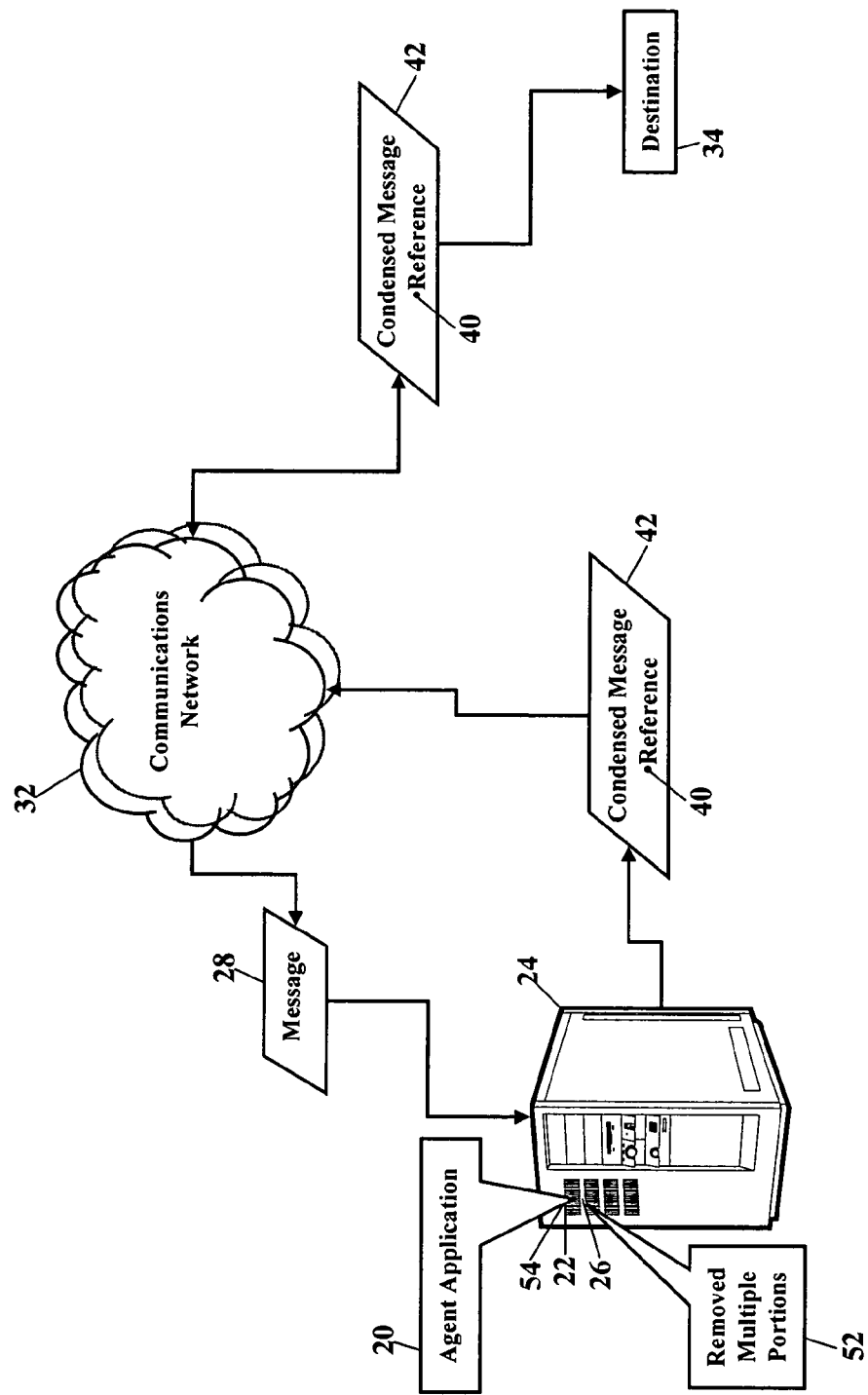
FIG. 3 is another schematic illustrating the condensing of messages, according to the present invention.

FIG. 3 is another schematic illustrating the condensing of messages, according to the present invention. Here, when the message 28 is received, the agent application 20 causes the processor 26 to replace multiple portions of the message 28 with the reference 40. As the processor 26 processes the message 28, the processor 26 removes multiple portions 52 within the message 28. Those multiple portions 52, however, are stored at a single memory location 54. The single memory location 54 may be within the local memory (such as the memory 22), or the single memory location 54 may be at the remote memory location (shown as reference numeral 38 in FIG. 1). Whatever the single memory location 54, the processor 26 inserts the reference 40 into the message 28. The reference 40 thus replaces the multiple portions 52, such that the processor 26 produces the condensed message 42. Whenever the message 28 contains repetitive information, that repetitive information may be removed. Each occurrence of the repetitive information is replaced by the reference 40. Because the reference 40 points or references the repetitive information, the message 28 is condensed.

Figure 4:
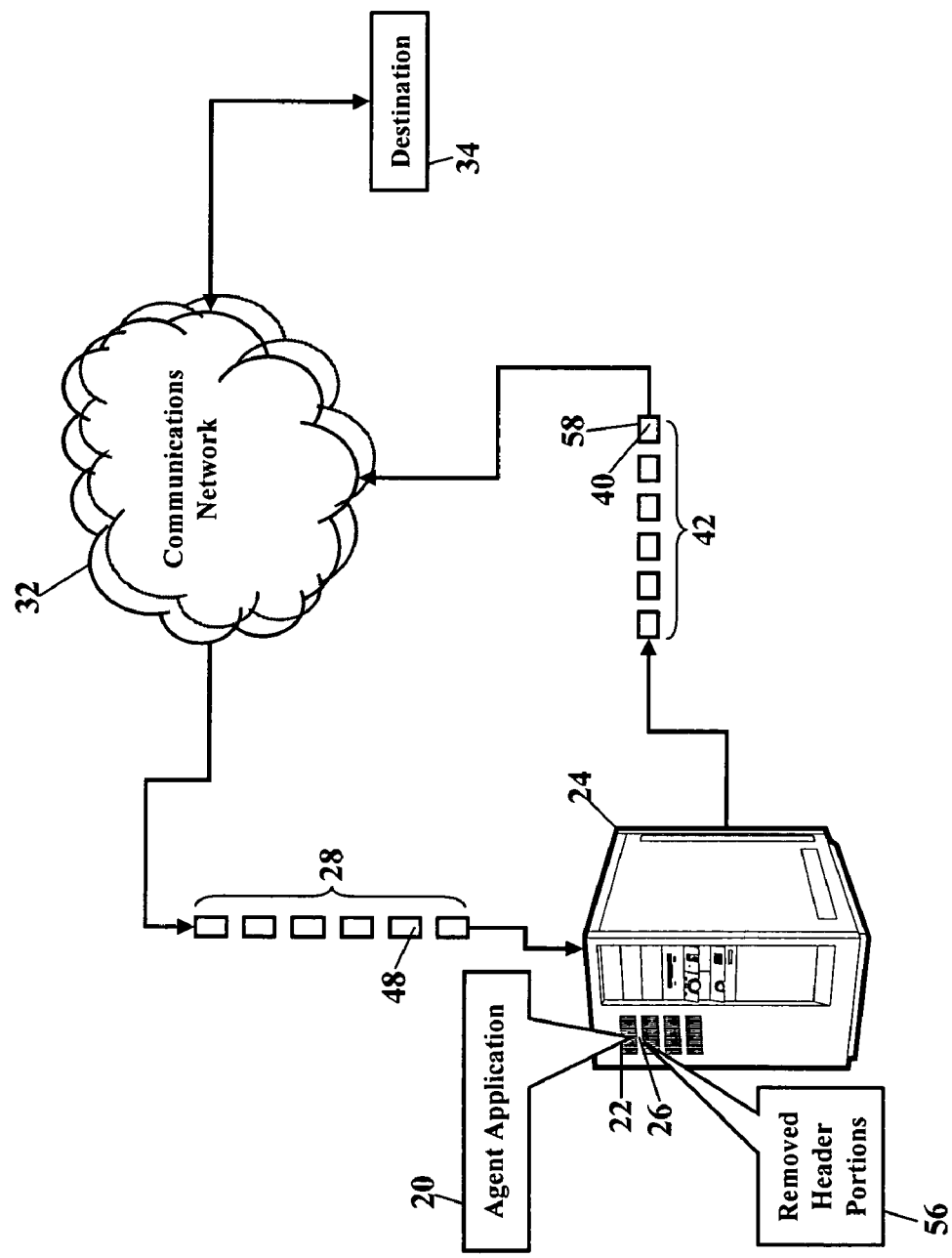
FIG. 4 is yet another schematic illustrating the condensing of messages, according to the present invention.

FIG. 4 is yet another schematic illustrating the condensing of messages, according to the present invention. Here, the processor 26 condenses the message 28 by removing multiple portions of one or more headers 48. When the message 28 is packetized, the agent application 20 causes the processor 26 to remove multiple portions 56 of the headers 48. Each of those multiple, removed portions 56 is replaced with the reference 40. The agent application 20 may additionally or alternatively instruct the processor 26 to merge all the references 40 within a single header 58. All the references 40, for example, may be merged into a single profile, statement, or portion of the header 58. So, rather than having multiple references 40, the processor 26 may further condense the message 28 by merging all the references 40 into a similar message location.

Figure 5:
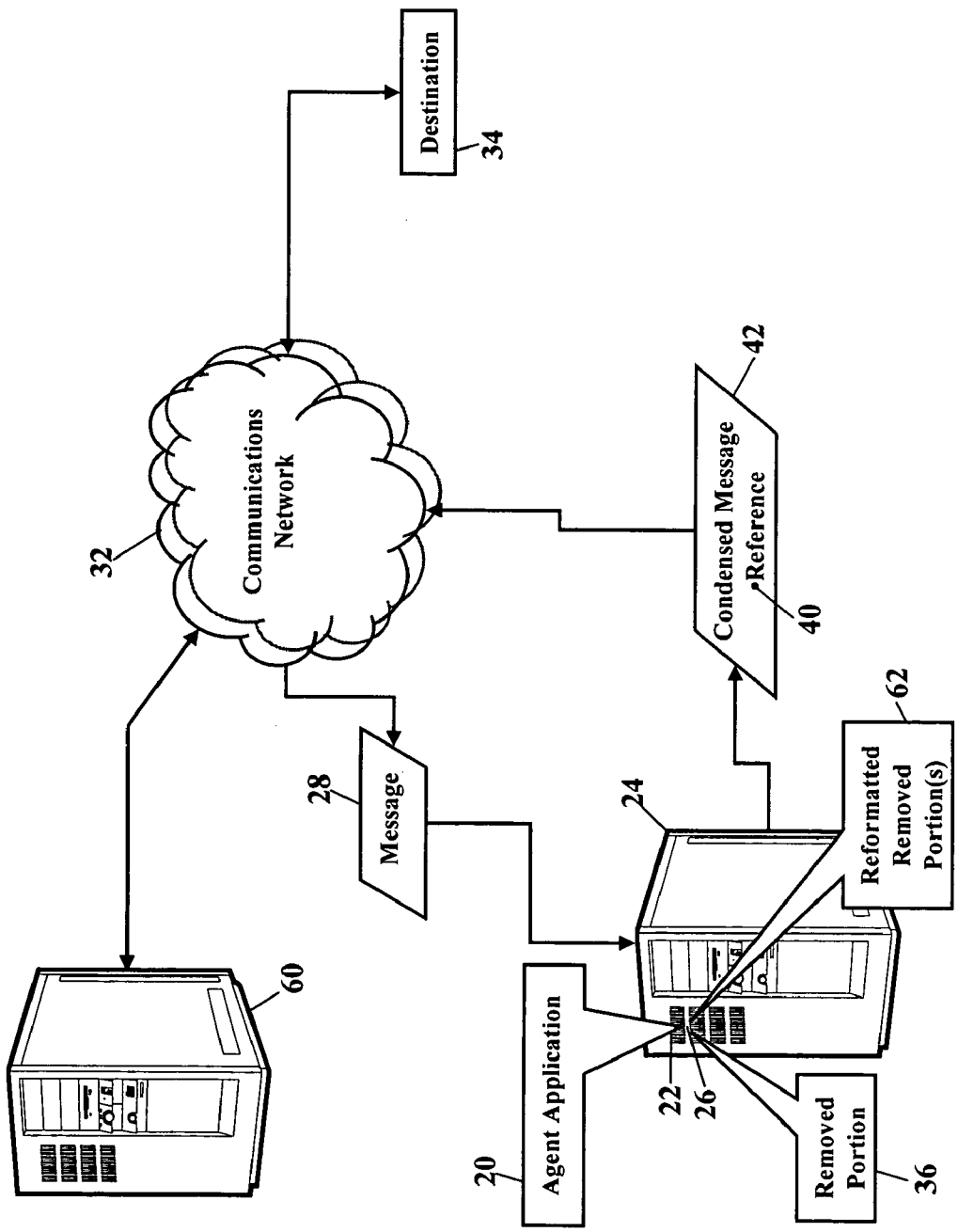
FIG. 5 is a schematic illustrating format changes, according to the present invention.

FIG. 5 is a schematic illustrating format changes, according to the present invention. Here, when one or more portions of the message 28 are removed and stored, the agent application 20 may change the format of any of those removed portions. Recall the computer 24 receives the message 28, and the agent application 20 causes the processor 26 to condense the message 28. The processor 26 removes one or more portions 36 of the message 28 and stores those removed portions 36 in local memory (such as the memory 22) and/or in the remote memory location (shown as reference numeral 38 in FIG. 1). The agent application 20 causes the processor 26 to replace the removed portions 36 with one or more of the references 40.

The agent application 20 may make those removed portions 36 available for auxiliary processing. That is, the removed portions 36 may be altered or changed to suit any purpose. When the agent application 20 instructs the processor 26 to remove portions of the message 28, the agent application 20 may decide that those removed portions 36 could be reformatted for simplicity, for brevity, or for compatibility. The one or more removed portions 36 may be verbose or complicated, and the agent application 20 may simplify, collapse, or compress those portions. The agent application 20 may reformat the removed portions 36 to suit the needs of the destination 34. The agent application 20 may even make the removed portions 36 available for subsequent processing by another application or another computer 60 (via the communications network 32). Whatever the reasons, when the processor 26 removes portions of the message 28, the agent application 20 may change those removed portions. FIG. 5, then, illustrates reformatted, removed portions 62. These reformatted, removed portions 62 are stored in the local memory (such as the memory 22). The reformatted, removed portions 62 may also be stored in the remote memory location (shown as reference numeral 38 in FIG. 1). The reformatted, removed portions 62, wherever stored, have an alternate formatting from that of the originally removed portions 36. The destination 34, then, may select whatever alternate formatting best suits current needs.

FIGS. 6-11 apply the present invention to Composite Capability/Preference Profile (CC/PP) information. The present invention may be used to condense Composite Capability/Preference Profile information, thus providing more efficient communication of such information. As those of ordinary skill in the art understand, CC/PP information provides a structure and a vocabulary for describing a communications device's hardware capabilities, software capabilities, and user preferences. Because Composite Capability/Preference Profile information is already known, this specification will not provide a detailed explanation of such information. If, however, the reader desires a detailed explanation, the reader is invited to consult W3C, *Composite Capability/Preference Profiles (CC/PP): Structure and Vocabularies*, available from the World Wide Web Consortium (W3C), 32 Vassar Street, Room 32-G515, Cambridge, Mass. 02139 USA and from the European Office of the World Wide Web Consortium (W3C), 2004, route des Lucioles, BP 93, 06902 Sophia-Antipolis Cedex France, and incorporated herein by reference in its entirety.

Figure 6:
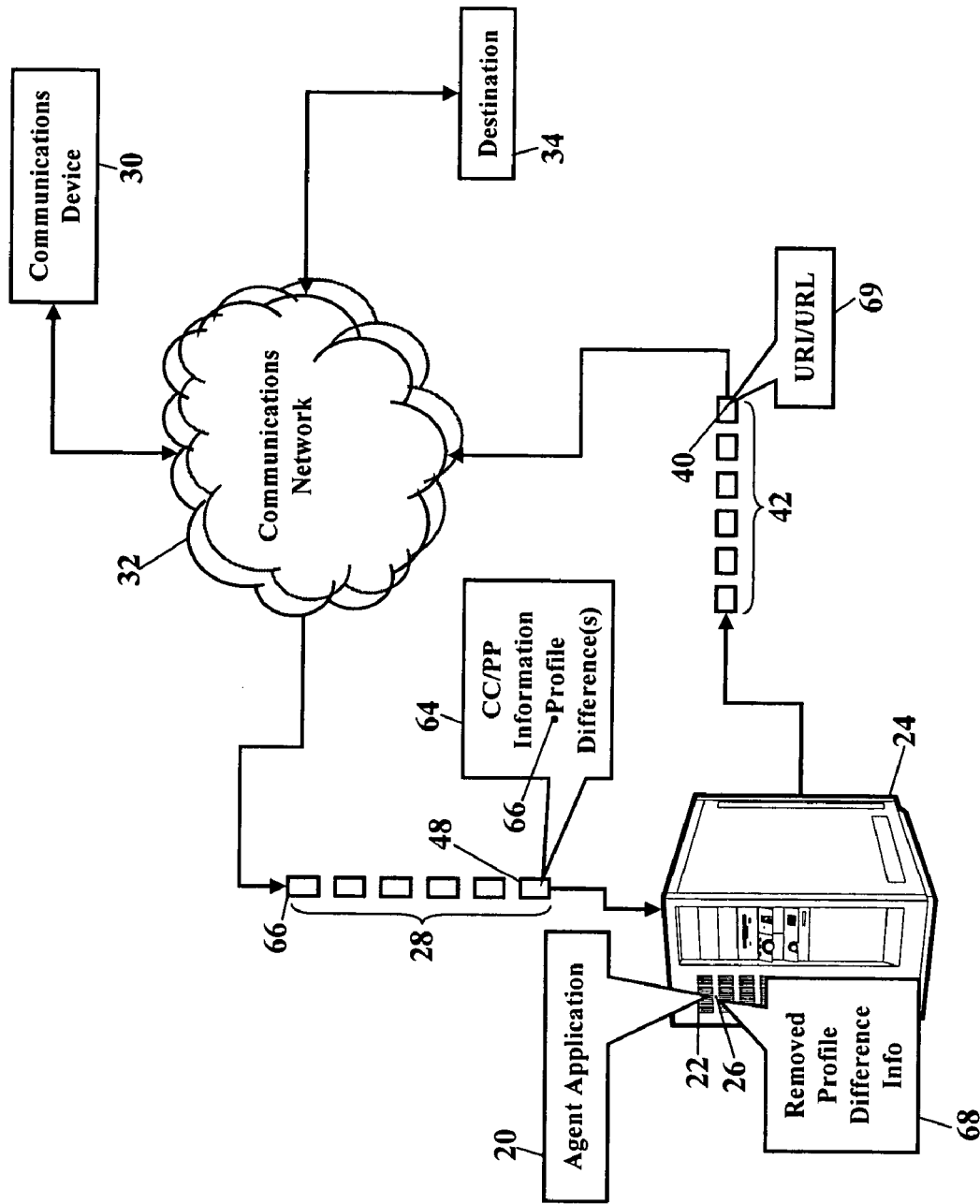
FIG. 6 is a schematic illustrating the condensing of Composite Capability/Preference Profile information, according to the present invention.

FIG. 6 illustrates the Composite Capability/Preference Profile information 64. The Composite Capability/Preference Profile (CC/PP) information 64 is contained within the message 28 received from the communications network 32. The agent application 20, operating within the computer 24, condenses the message 28 for more efficient transmission or communication to the destination 34. Here, however, the computer 24 represents any network device that may receive and/or process the message 28. The computer 24, for example, may be a proxy server, a web server, a wireless access point, or any other computer or server communicating via the communications network 32.

As the computer 24 receives the message 28, the agent application 20 instructs the processor 26 to inspect the headers 48 of the packets 66. The agent application 20, in this embodiment, instructs the processor 26 to inspect the headers 48 for the Composite Capability/Preference Profile information 64. When the processor 26 observes the Composite Capability/Preference Profile information 64, the agent application 20 instructs the processor 26 to inspect that Composite Capability/Preference Profile information 64 for profile difference information 66. As those of ordinary skill in the art recognize, the profile difference information 66 (or "profile diffs") describes differences between default settings and user settings. The user's communications device 30, for example, may have display settings, video settings, hardware settings, software settings, or any other settings that differ from a manufacturer's default settings. The profile difference information 66, then, describes these differences.

The agent application 20 condenses the profile difference information 66. Because the profile difference information 66 can be a large, verbose document, the agent application 20 may replace the profile difference information 66 with one or more of the references 40. The processor 26 replaces the verbose profile difference information 66 with the shorter and simpler reference 40. The processor 26 stores the removed profile difference information (shown as reference numeral 68) in local memory (such as the memory 22) and/or in the remote memory location (shown as reference numeral 38 in FIG. 1). The agent application 20 causes the processor 26 to replace the removed profile difference information 68 with, for example, a Uniform Resource Indicator/Locator (URI/URL) 69 to the memory location where the removed profile difference information 68 is stored. Because the shorter/smaller reference 40 replaces the larger, removed profile difference information 68, the processor thus shortens the message 28 and produces the condensed message 40. The condensed message 40 is then more quickly communicated via the communications network 32 to the destination 34.

The reference 40 condenses the message 28. When the message 28 is received by the processor 26, the message 28 may include profile headers, Uniform Resource Indicators/Locators to default profiles, and the profile difference information 66. The agent application 20, however, replaces the profile difference information 66 with the external references 40 (such as the URI/URL 69). The agent application 20 thus collapses the message 28 by removing the profile difference information 66 from the message 28. The agent application 20 augments the Composite Capability/Preference Profile information 64 with the reference 40.

Figure 7:
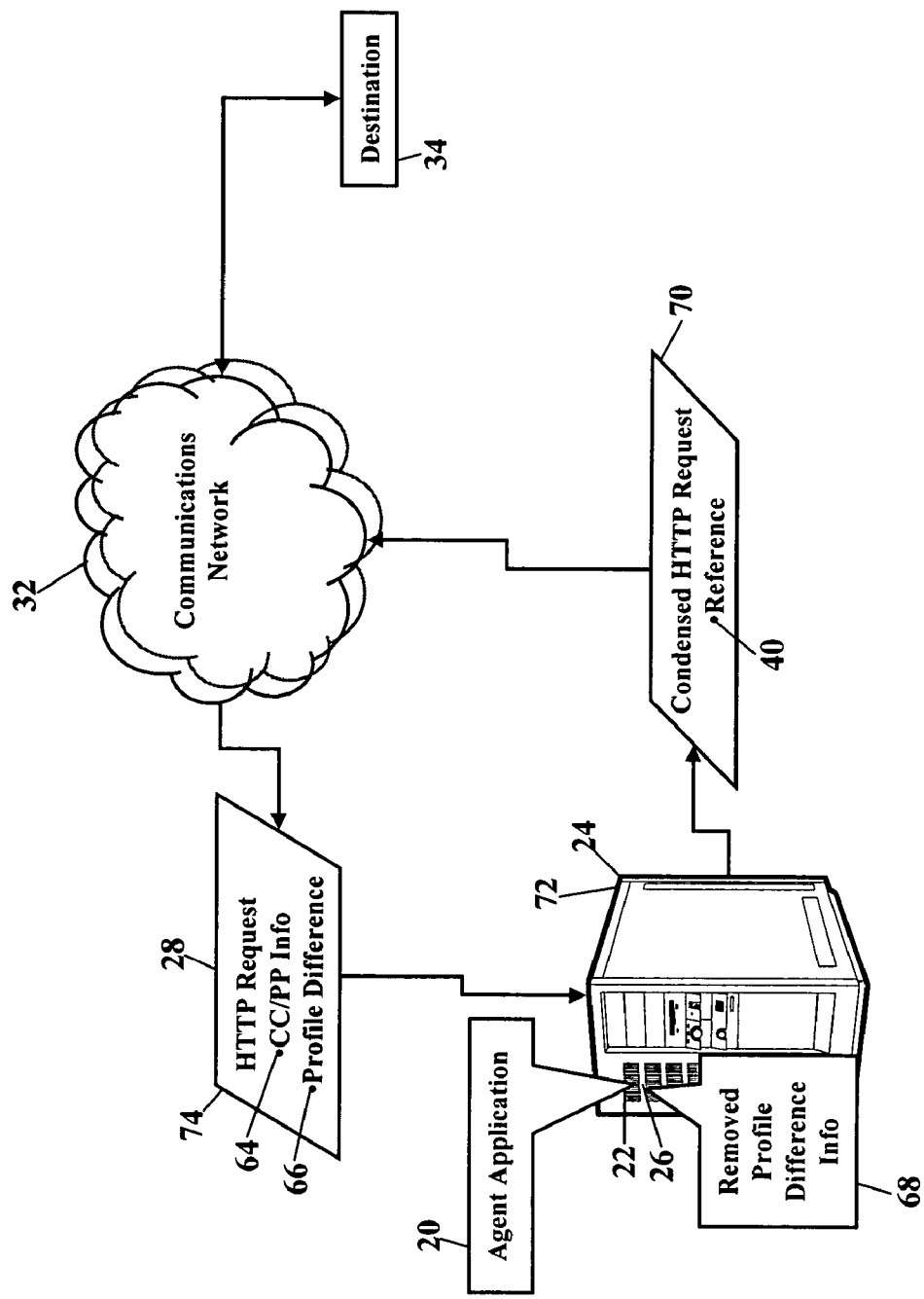
FIGS. 7 and 8 are schematics illustrating a condensed HTTP request, according to the present invention.
Figure 8:
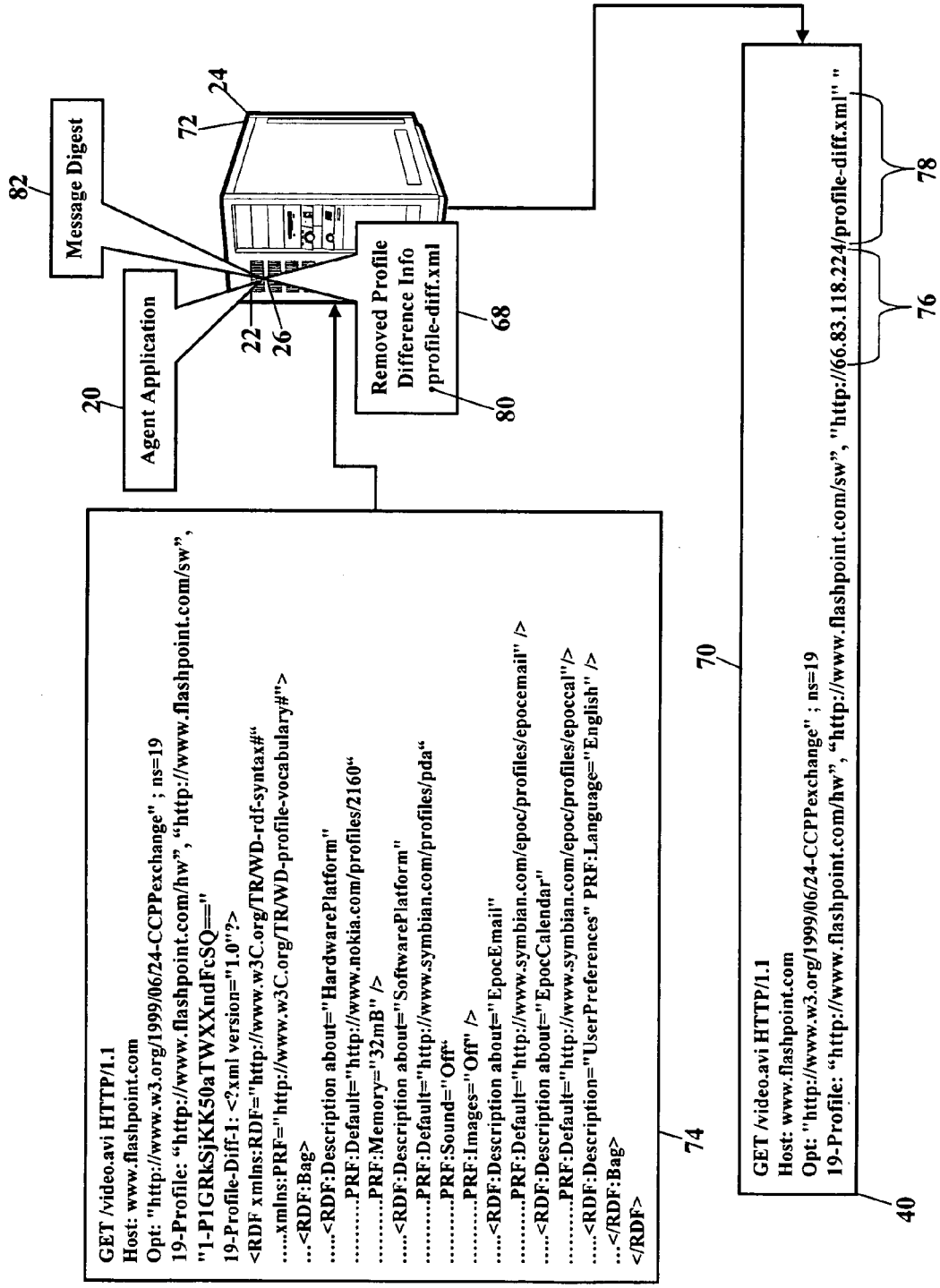

FIGS. 7 and 8 provide a further explanation. FIG. 7 is a schematic illustrating a condensed HTTP request 70, according to the present invention. Here the computer 24 acts as a proxy server 72 and receives the message 28. The message 28 is an HTTP request 74. The agent application 20 instructs the processor 26 to inspect the message 28 for the Composite Capability/Preference Profile information 64. When the processor 26 observes the profile difference information 66, the processor 26 removes the profile difference information 66 and stores the removed profile difference information 68 in the local memory 22. The processor 26 then inserts the shorter and smaller reference 40. Because the shorter/smaller reference 40 replaces the removed profile difference information 68, the processor thus shortens the message 28 and produces the condensed message 40. The condensed message 40 is then more quickly communicated via the communications network 32 to the destination 34.

FIG. 8 illustrates the effectiveness of this invention. FIG. 8 illustrates the proxy server 72 receiving the following verbose HTTP request 74:

```
GET /video.avi HTTP/1.1
Host: www.flashpoint.com
Opt: "http://www.w3.org/1999/06/24-CCPPexchange" ; ns=19
19-Profile: "http://www.flashpoint.com/hw",
"http://www.flashpoint.com/sw", "1-P1GRkSjKK50aTWXXndFcSQ=="
19-Profile-Diff-1: <?xml version="1.0"?>
<RDF xmlns:RDF="http://www.w3C.org/TR/WD-rdf-syntax#"
    xmlns:PRF="http://www.w3C.org/TR/WD-profile-vocabulary#">
  <RDF:Bag>
    <RDF:Description about="HardwarePlatform"
        PRF:Default="http://www.nokia.com/profiles/2160"
        PRF:Memory="32mB" />
      <RDF:Description about="SoftwarePlatform"
        PRF:Default="http://www.symbian.com/profiles/pda"
        PRF:Sound="Off"
        PRF:Images="Off"/>
      <RDF:Description about="EpocEmail"
        PRF:Default="http://www.symbian.com/epoc/profiles/
        epocemail"/>
      <RDF:Description about="EpocCalendar"
        PRF:Default="http://www.symbian.com/epoc/profiles/epoccal"/>
      <RDF:Description="UserPreferences" PRF:Language=
    "English"/>
  </RDF:Bag>
</RDF>
```

The agent application 20, then, collapses the message 28 into the following condensed message 40:

```
GET /video.avi HTTP/1.1
Host: www.flashpoint.com
Opt: "http://www.w3.org/1999/06/24-CCPPexchange" ; ns=19
19-Profile: "http://www.flashpoint.com/hw",
"http://www.flashpoint.com/sw",
"http://66.83.118.224/profile-diff.xml"
```

Here, then, the profile header now includes the reference 40. The reference 40 includes an Internet Protocol address 76 and a file name 78. The Internet protocol address 76 ("http://66.83.118.224") refers to an I.P. address where the removed profile difference information 68 is stored. In this example, the removed profile difference information 68 is locally stored in the memory 22, so the I.P. address represents a network address for the proxy server 72 (e.g., the computer 24). The file name 78 ("profile-diff.xml") is a unique filename that refers to the removed profile difference information 68. This example thus uses the Hyper Text Transfer Protocol (HTTP). The exemplary embodiments, however, may utilize the File Transfer Protocol (FTP), in which case the URL is identical except the "http" becomes "ftp" (e.g., "ftp://66.83.118.224/profile-diff.xml").

The removed profile difference information 68 is stored as a file 80. In this example the processor 26 stored the removed profile difference information 68 in the local memory 22. The processor 26, however, could locally or remotely store the removed profile difference information 68 in a database. The file "profile-diff.xml" 80 contains the removed profile difference information 68. That removed profile difference information 68, for example, may contain the following statements:

```
<?xml version="1.0"?>
<RDF xmlns:RDF="http://www.w3C.org/TR/WD-rdf-syntax#"
    xmlns:PRF="http://www.w3C.org/TR/WD-profile-vocabulary#">
  <RDF:Bag>
    <RDF:Description about="HardwarePlatform"
        PRF:Default="http://www.nokia.com/profiles/2160"
        PRF:Memory="32mB" />
      <RDF:Description about="SoftwarePlatform"
        PRF:Default="http://www.symbian.com/profiles/pda"
        PRF:Sound="Off"
        PRF:Images="Off"/>
      <RDF:Description about="EpocEmail"
        PRF:Default="http://www.symbian.com/epoc/profiles/
        epocemail"/>
      <RDF:Description about="EpocCalendar"
        PRF:Default="http://www.symbian.com/epoc/profiles/epoccal"/>
      <RDF:Description="UserPreferences" PRF:Language="English"/>
  </RDF:Bag>
</RDF>
```

The agent application 20 may use a message digest 82. The reference to the profile difference in the profile-header may be comprised of an index and the message digest value 82. The index is used to identify the name of the HTTP request header that contains the profile difference information. In addition to the index in the profile difference reference, the exemplary embodiments may also consider the namespace for the CC/PP information (as defined in the "Opt" header). In the example shown in FIG. 8 (and in paragraph [0028]), the reference to the profile difference is "1-P1GRkSjKK50aTWXXndFcSQ==". Combining the index in the profile difference reference of "1" and the namespace of "19" allows a system to know that the profile difference is the HTTP header with the name "19-Profile-Diff-1". The message digest 82 is the value after the "1-" in the profile difference reference. The message digest 82 is a unique computed value based on the contents of the profile difference. The agent application 20 may use the message digest value 82 to identify whether it has already processed the same profile difference. When processing a HTTP request, the agent application 20 may check the message digest of a profile difference against the message digests of its stored profile diffs. If the agent application 20 detects that it has a profile diff stored that has the same message digest value, then the agent application 20 has less work to do. The agent application 20 removes the profile difference from the original message 28 and replaces the profile difference reference in the profile header with the reference 40. The agent application 20, in other words, operates as before, but the agent application 20 skips the step of extracting the profile difference to the file 80.

When the destination (shown as reference numeral 34 in FIG. 7) receives the condensed HTTP request 70, the destination 34 need do nothing special or extraordinary. The destination 34, in other words, need not change to process the condensed HTTP request 70. Even though the originally received HTTP request 74 has been condensed, the condensed HTTP request 70 simply resembles an ordinary or regular request. The destination 34 fetches each reference 40 (such as by querying the Uniform Resource Indicator/Locator), processes the information represented by each reference 40, and arranges the results according to precedence. The destination 34 thus has all the information needed for tailoring the requested content. The condensed HTTP request 70 thus creates no change in the operation of the destination 34.

The agent application 20 may retain the removed profile difference information 68 for any length of time. Recall the removed profile difference information 68 is stored as the file 80. The agent application 20, of course, may delete the file 80 when additional memory is desired. The agent application 20 might detect that the removed profile difference information 68 is no longer needed (such as a lack of usage), so the information 68 is deleted. Remember, however, that the removed profile difference information 68 may be applicable to multiple users. Many wireless customers, for example, utilize a NOKIA® device, so the agent application 20 need not maintain user-specific cached versions. The removed profile difference information 68 may be common to multiple users and, thus, frequently accessed. The agent application 20, then, may retain that common profile difference information 68 in long-term memory for future use.

Figure 9:
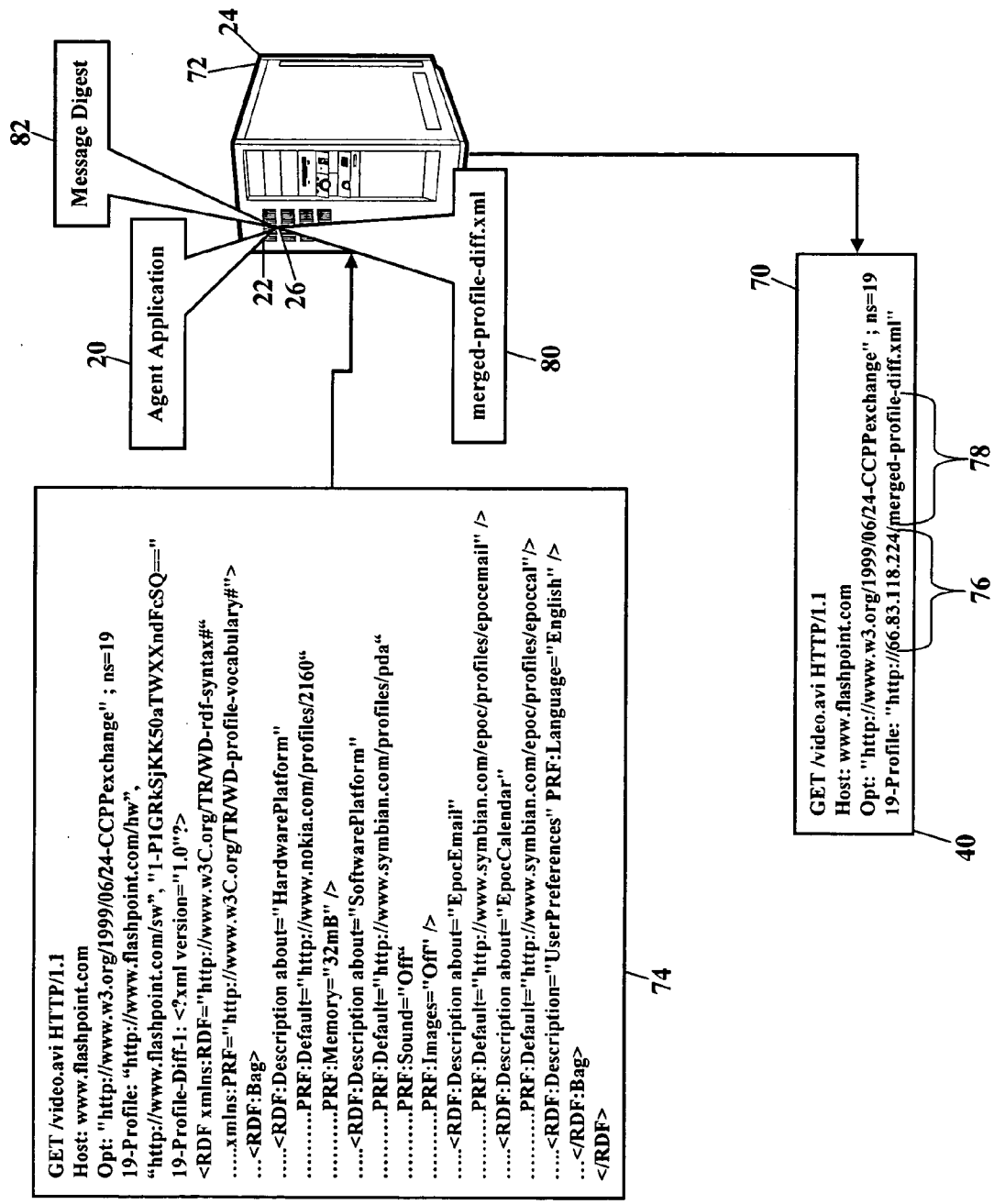
FIG. 9 is a schematic illustrating a profile merge, according to the present invention.

FIG. 9 is a schematic illustrating a profile merge, according to the present invention. Here the computer 24 (acting as the proxy server 72) merges one or more profile references, one or more profile differences, and one or more of the references 40 into a single statement. Because all this information is condensed, the agent application 20 condenses the message 28 and relieves the workload of a downstream server (such as the destination 34 shown in FIGS. 1-7). When the processor 26 receives the HTTP request 74, the processor 26 merges all profile references and all the profile differences into a single profile. FIG. 9, then, illustrates the proxy server 72 condensing the HTTP request 74 as

---

GET /video.avi HTTP/1.1
Host: www.flashpoint.com
Opt: "http://www.w3.org/1999/06/24-CCPPexchange" ; ns=19
19-Profile: "http://66.83.118.224/merged-profile-diff.xml"

---

Here the IP address 76 ("http://66.83.118.224") in the profile header refers to the IP address where the profile information is stored. In this example, the profile information is locally stored in the memory 22, so the I.P. address represents a network address for the computer 24 (e.g., the proxy server 72). The file name 78 in the URI ("merged-profile-diff.xml") is a unique name that refers to the profile created by merging the profiles located at http://www.flashpoint.com/hw, http://www.flashpoint/sw, and Profile-Diff-1. The proxy server 72 thus has the file 80 named "merged-profile-diff.xml" that contains the results of fetching the two referenced profiles and the profile difference(s). The condensed HTTP request 70 has a single profile reference ("merged-profile-diff.xml"), even though the agent application 20 merged two profiles (referenced in the profile header) and one profile difference (referenced in the profile header that was embedded in the HTTP request). Remember, the agent application 20 fetches profiles from an external source using the reference, while profile differences are an internal reference to another header embedded in an HTTP request that contains the text of the profile diff. The destination need only fetch that single profile reference, and the destination need not fetch two profiles and merge them with the profile difference embedded in the request 74 (the agent application 20, after all, has already performed this operation). The condensed HTTP request 70, therefore, relieves the workload on the destination 34. The condensed HTTP request 70 also relieves the workload on servers at the locations at which the URI/URL profile references point.

The original profile repository ("www.flashpoint.com") experiences a reduced load. Normally the destination 34 would cache a profile and send HTTP requests to the profile repository to check if the cached profile was stale. Now, however, that the proxy server 72 merges the profile and stores the result, the original profile repository is not contacted for profile fetches or staleness checks. The destination 34, instead, contacts the proxy server 72 to fetch the merged profile and perform staleness checks.

The proxy server 74 can also help to reduce its own workload and the workload on the destination server. Specifically, the proxy server 74 can include a last modified date of the merged profile in the HTTP request to the destination 34. This last modified date preemptively provides the destination 34 with the result of a stale check, all without having to contact the proxy server 74. Normally, if the destination 34 cached the merged profile, the destination 34 would send a request to the profile repository to check if the profile was stale. Now, the destination 34 receives the last modified date in the request and no longer is forced to always contact the proxy server 74 to test for staleness. If the cached version is stale, the destination 34 would fetch the newer version of the profile from the proxy server 74. However, if the cached version is still valid, the destination 34 has saved itself an HTTP request to the proxy server 74 for the stale check.

The agent application 20 may alternatively only perform a partial merge. The computer 24 (e.g., the proxy server 72), for example, may have already cached the profile identified by http://www.flashpoint.com/sw, but the computer 24 may not have cached the profile at http://www.flashpoint.com/hw. That is, when the HTTP request 74 has multiple URI/URL references to profiles, the agent application 20 may not pause and fetch all those references. To avoid further delaying the HTTP request 74, the agent application 20 may decide to only merge the "19-Profile-Diff-1" and Profile at http://www-.flashpoint.com/sw. The resultant condensed message thus contains the following profile header:

Profile: "http://www.flashpoint.com/hw", "http://66.83.118.224/partially-merged-profile.xml".

The agent application 20 may fetch and cache the missing profile ("http://www.flashpoint.com/hw") on a separate thread to avoid delaying the initial HTTP request 74. The agent application 20 may also include code or instructions that help ensure the overriding order is maintained according to the specification(s).

A partial profile merge may also be useful for common device types. Realize, again, that many wireless customers, for example, utilize a NOKIA® device. Even though many people utilize NOKIA® phones, these users may have unique sets of installed software programs. Any merging of the common NOKIA® hardware profile with unique software profiles might produce a large and/or inefficient result. Here, then, the agent application 20 may find it more efficient to only partially merge profiles. The agent application 20, for example, may locally cache those hardware profiles, yet, not perform a merge with software profiles. The downstream destination 34, then, may cache the NOKIA® hardware profile(s) and simply fetch the user-specific set of software profiles. A partial profile merge, in other words, may be more efficient, so that requests are not always optimized.

Figure 10:
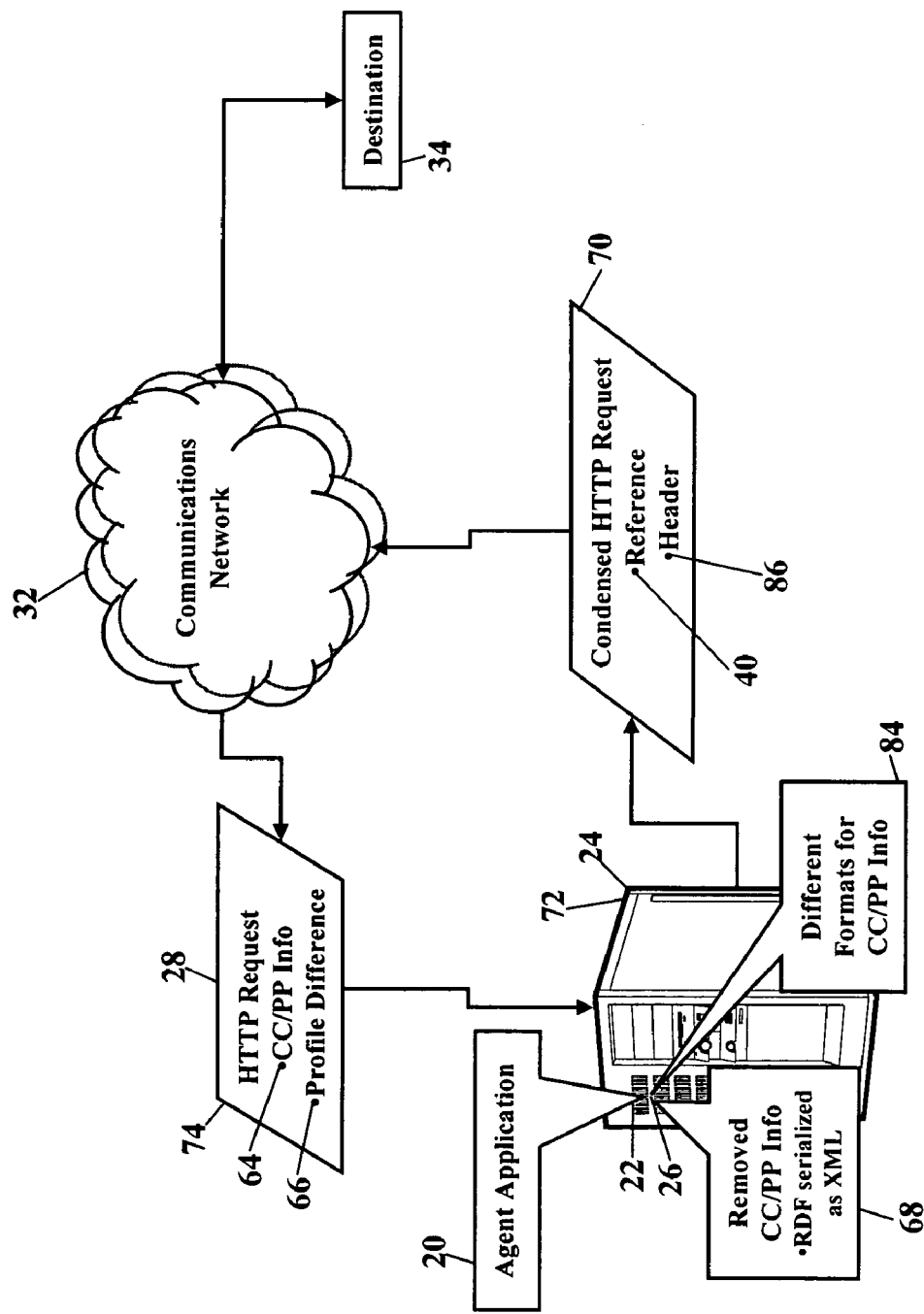
FIG. 10 is a schematic illustrating format changes to the Composite Capability/Preference Profile information.

FIG. 10 is a schematic illustrating format changes to the Composite Capability/Preference Profile information 64, according to still more embodiments of the present invention. Here, when the agent application 20 removes and stores some or all of the Composite Capability/Preference Profile information 68, the agent application 20 may translate that removed Composite Capability/Preference Profile information 68 into other formats 84. The agent application 20, for example, may translate a removed CC/PP Profile into one or more different formats that provide any benefit over the standard CC/PP RDF format serialized as XML. The agent application 20 may itself performs this translation, or the agent application 20 may communicate the removed Composite Capability/Preference Profile information 64 to another computer for this translation. Because the agent application 20 makes these alternate formats 84 available, the destination 34 may then retrieve any format that best suites its needs.

As FIG. 10 illustrates, the computer 24 receives the HTTP request 74. When the processor 26 observes the Composite Capability/Preference Profile information 64, the agent application 20 condenses the HTTP request 74 (as the above paragraphs explain). Here, however, in addition to storing the removed Composite Capability/Preference Profile information 68 as an RDF document serialized as XML, the agent application 20 may also store the Composite Capability/Preference Profile information 68 in the other formats 84. As those of ordinary skill in the art recognize, when an RDF document is serialized as XML, that "RDF in XML" may be difficult to parse. These other formats 84, then, may provide any benefit desired, such as being quicker to parse or being more compact. The agent application 20 may add a header 86 to the condensed HTTP request 70. The destination 34 may inspect this header 86 and know what other formats have been additionally produced. The agent application 20, for example, may communicate the following condensed message 70.

```
GET /video.avi HTTP/1.1
Host: www.flashpoint.com
Opt: "http://www.w3.org/1999/06/24.CCPPexchange" ; ns=19
19-Profile: "http://66.83.118.224/profile-diff.xml"
Proxy-Profile-Formats: wbxml, xml
```

Here, then, the statement "Proxy-Profile-Formats: wbxml, xml" describes the other available formats. The agent application 20 has thus additionally formatted the removed Composite Capability/Preference Profile information 68 into a WAP Binary XML (WBXML) format and into an XML format. These pure XML formats may not contain RDF formatting. The agent application 20 may additionally make available the original formatting (e.g., RDF serialized as XML). The destination 34 may simply choose and fetch its desired format. The destination 34, for example, may add a request parameter to the profile fetch operation to indicate the profile format. For example, it could use this HTTP request to fetch the wbxml format:

```
http://66.83.118.224/profile-diff.xml?format=wbxml
```

Figure 11:
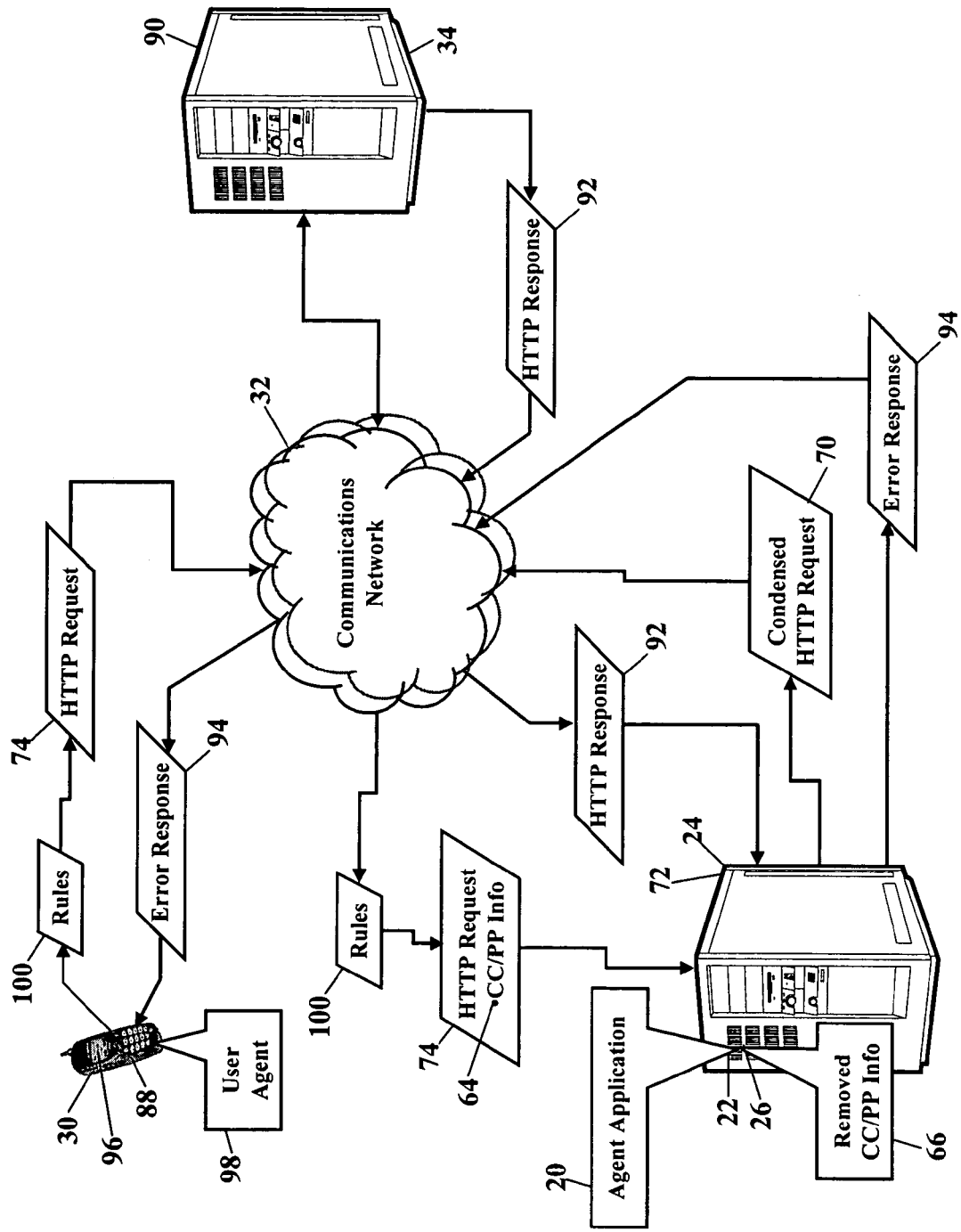
FIG. 11 is a schematic illustrating a cancellation of the HTTP request, according to yet more embodiments of the present invention.

FIG. 11 is a schematic illustrating a cancellation of the HTTP request 74, according to yet more embodiments of the present invention. Here the proxy server 72 again receives the HTTP request 74 (e.g., the message 28). The HTTP request 74 is shown originating from the communications device 30, such as a cellular phone 88. When the processor 26 observes the Composite Capability/Preference Profile information 64, the agent application 20 again condenses the HTTP request 74 (as the above paragraphs explain). The condensed message 70 is then communicated via the communications network 32 to the destination 34. The destination 34 is shown as a web server 90. Ordinarily the web server 90 would adapt the requested content according to the Composite Capability/Preference Profile information 64 (as is already known).

Here, however, the web server 90 declines to adapt the requested content. The web server 90 may, for many reasons, decide to not adapt the requested content according to the Composite Capability/Preference Profile information 64. If, for example, a profile repository is unreachable, the web server 90 would be unable to obtain a profile that is required to adapt the requested content. The web server 90, in another situation, may have reserved processing time for other requests (such as for premium customers), so the web server 90 declines to tailor the requested content according to the Composite Capability/Preference Profile information 64. Whatever the reason, the web server 90 returns a response 92. The response 92 may include or describe unaltered content and/or an error message.

The agent application 20, then, may cancel the request. The agent application 20 inspects the response 92 to determine whether bandwidth may be conserved. When, for example, the web server 90 declines to adapt the requested content, the response 92 may include the unaltered content. This unaltered content, of course, is unsuited to the capabilities of the communications device 30 (e.g., the cellular phone 88). If the response 92 includes an error message, the communications device 30 (and the agent application 20) knows that the HTTP request 74 cannot be fulfilled. The agent application 20, then, may examine the response 92 to detect whether or not the web server 90 tailored the requested content. The agent application 20, for example, may examine the profile-warning headers in the HTTP response 92 from the web server 90. If the web server 90 fails to adapt the requested content, the agent application 20 may cancel the HTTP request 74, thereby saving bandwidth for both the communications device 30 and the web server 90.

This cancellation may also be applied when the web server 90 does not understand CC/PP based requests. The agent application 20 may detect that profile-warning headers are not in the HTTP response 92. The agent application 20 thus knows that the HTTP request 74 was not adapted to the capabilities of the communications device 30. Although the requested content was not adapted, the HTTP request 74 need not be rejected. The agent application 20 may examine the HTTP response 92 (e.g., the returned, unaltered content) and compare it against the capabilities described by the Composite Capability/Preference Profile information 66 stored in the memory 22. If the returned, unaltered content is generally compatible with the capabilities of the communications device 30 (e.g., the cellular phone 88), the agent application 20 may forward the returned, unaltered content to the communications device 30. The agent application 20, however, may forward an error response 94 indicating why the requested content is unavailable (e.g., the resolution is too large to suit a display device 96 of the cellular phone 88). For example, the agent application 20 may detect that a video resolution is 1024×768, whereas the Composite Capability/Preference Profile information 66 indicates the display device 96 has a maximum resolution of 320×200. The agent application 20 may return the error response 94, and the error response indicates the web server's returned, unaltered content is incompatible. The error response 94 may also include a Uniform Resource Indicator/Locator so that the end user of the communications device 30 may override this automatic cancellation.

The agent application 20 may also exchange rules with the communications device. As those of ordinary skill in the art understand, the communications device 30 (such as the cellular phone 88) may store and execute a user agent 98. The user agent 98 is any software application that sends the HTTP request 74. The user agent 98, for example, may be a web browser or any other application. Here, then, the user agent 98 may actively participate with the agent application 20 in exchanging rules 100. These rules 100 describe when to cancel the HTTP request 74. The user agent 98, for example, may indicate that it still wants a video because the user is going to save that video to offline storage.

Figure 12:
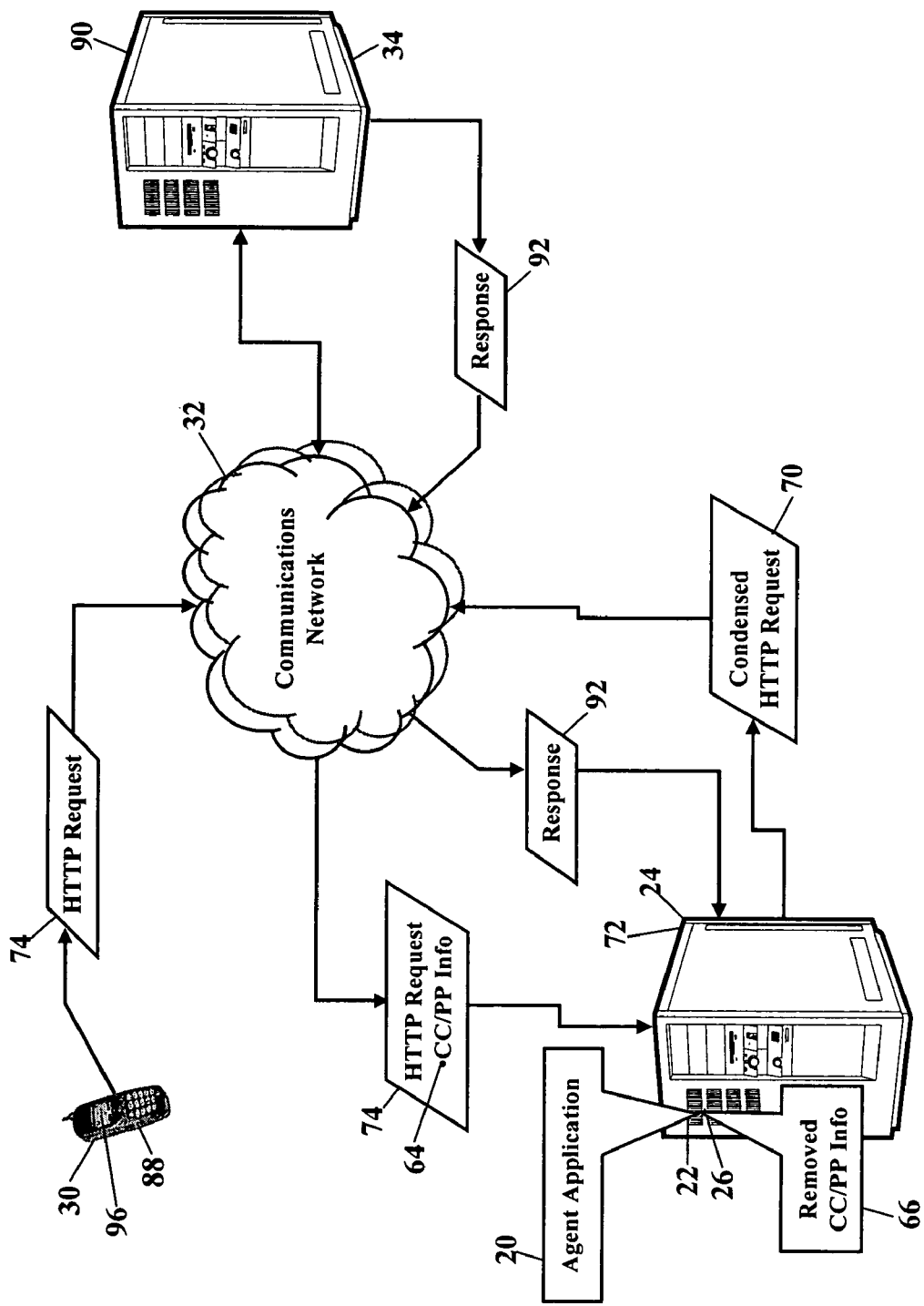
FIGS. 12 and 13 are schematics illustrating a switching of profiles, according to the present invention.
Figure 13:
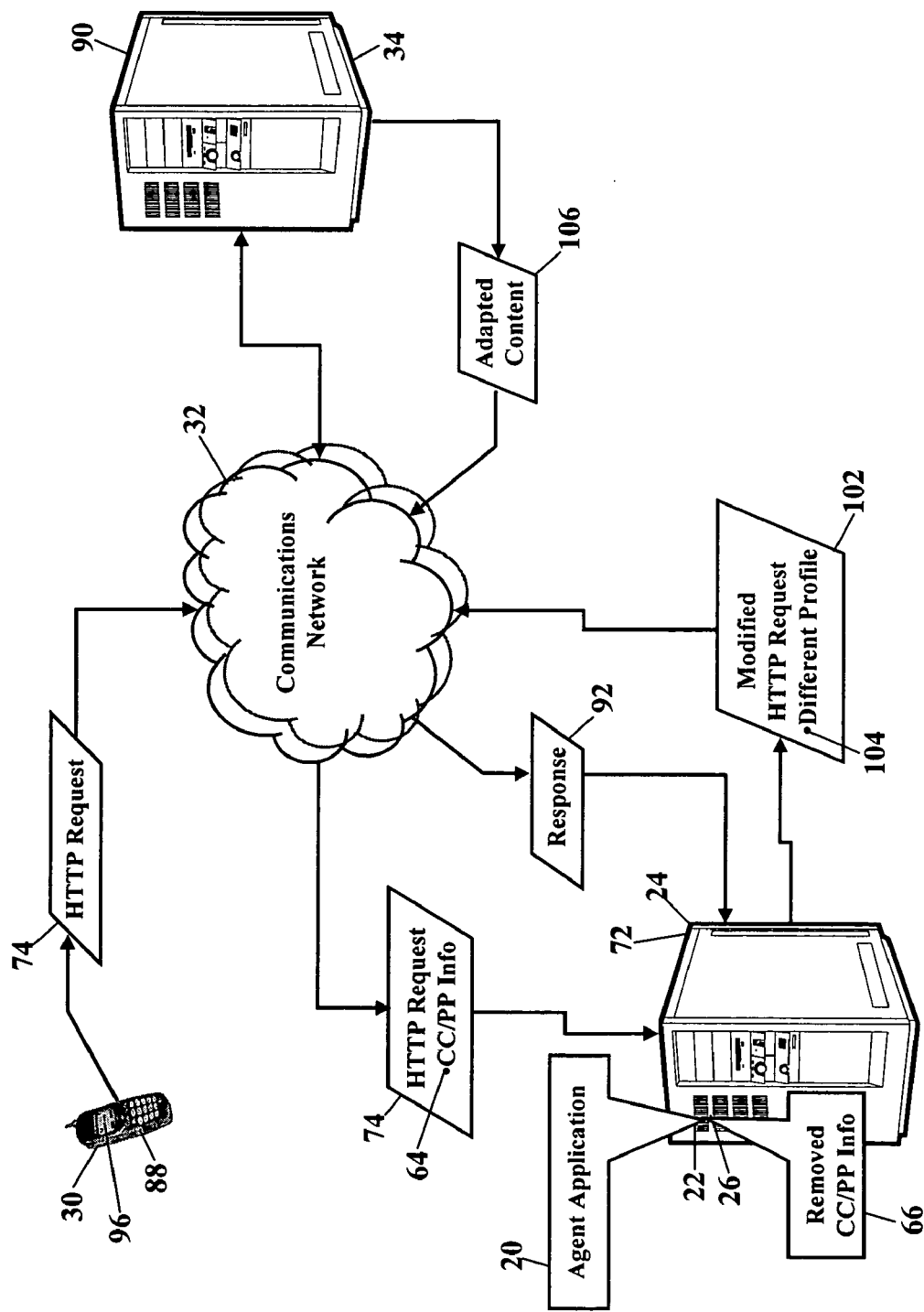

FIGS. 12 and 13 are schematics illustrating a switching of profiles, according to the present invention. Here, when the destination 34 (e.g., the web server 90) declines or fails to adapt the requested content, the agent application 20 may re-send the condensed HTTP request 70 with different profiles. The agent application 20 may recreate the condensed HTTP request 70 using one or more different profiles. The agent application 20, then, sends a modified HTTP request 102 to the web server 90. This modified HTTP request 102 comprises one or more different profiles 104. The agent application 20, for example, may switch to a more generic profile or switch the profile a different device type. The agent application 20 may be configured to retry as many times as desired, with each attempt switching to a different profile. An administrator, or the user of the communications device 30, however, may not want the agent application 20 to indefinitely retry different profiles. Each attempt would consume time and bandwidth, and the administrator or user may make configurations that limit such retries.

The agent application 20 receives the HTTP request 74 from the communications device 30. The agent application 20 condenses the HTTP request 74 into the condensed HTTP request 70 (as the above paragraphs explain). The condensed HTTP request 70 is then communicated via the communications network 32 to the web server 90. The web server 90 return sends the response 92, indicating the requested content was not adapted, for whatever reason.

FIG. 13 illustrates the modified HTTP request 102. Because the condensed HTTP request 70 failed, here the agent application 20 retries. The agent application 20 uses one or more different profiles, or eliminates one or more profiles, to create the modified HTTP request 102. The agent application 20, for example, may retry using a profile that only contains a maximum resolution of the display device 96. The agent application 20, then, sends the modified HTTP request 102 to the web server 90. FIG. 13 illustrates the web server 90 responding with adapted content 106. This adapted content 106 no longer fails, for example, because of an unreachable profile repository. The agent application 20, as an additional example, may switch to a profile of a similar device that has previously had content successfully adapted. The agent application 20 would then retry using that similar-device profile.

The agent application 20 and the web server 90 may make other exchanges. The agent application 20 and the web server 90, for example, may establish a profile exchange to detect compatibilities. The agent application 20 may send a collection of profiles to the web server 90. The web server 90 may then send an acceptance or rejection for each profile in the collection. The agent application 20 would then know what profiles are acceptable to the web server 90. When the agent application 20 receives future requests, the agent application 20 knows ahead of time whether the web server 90 accepts that profile.

Figure 14:
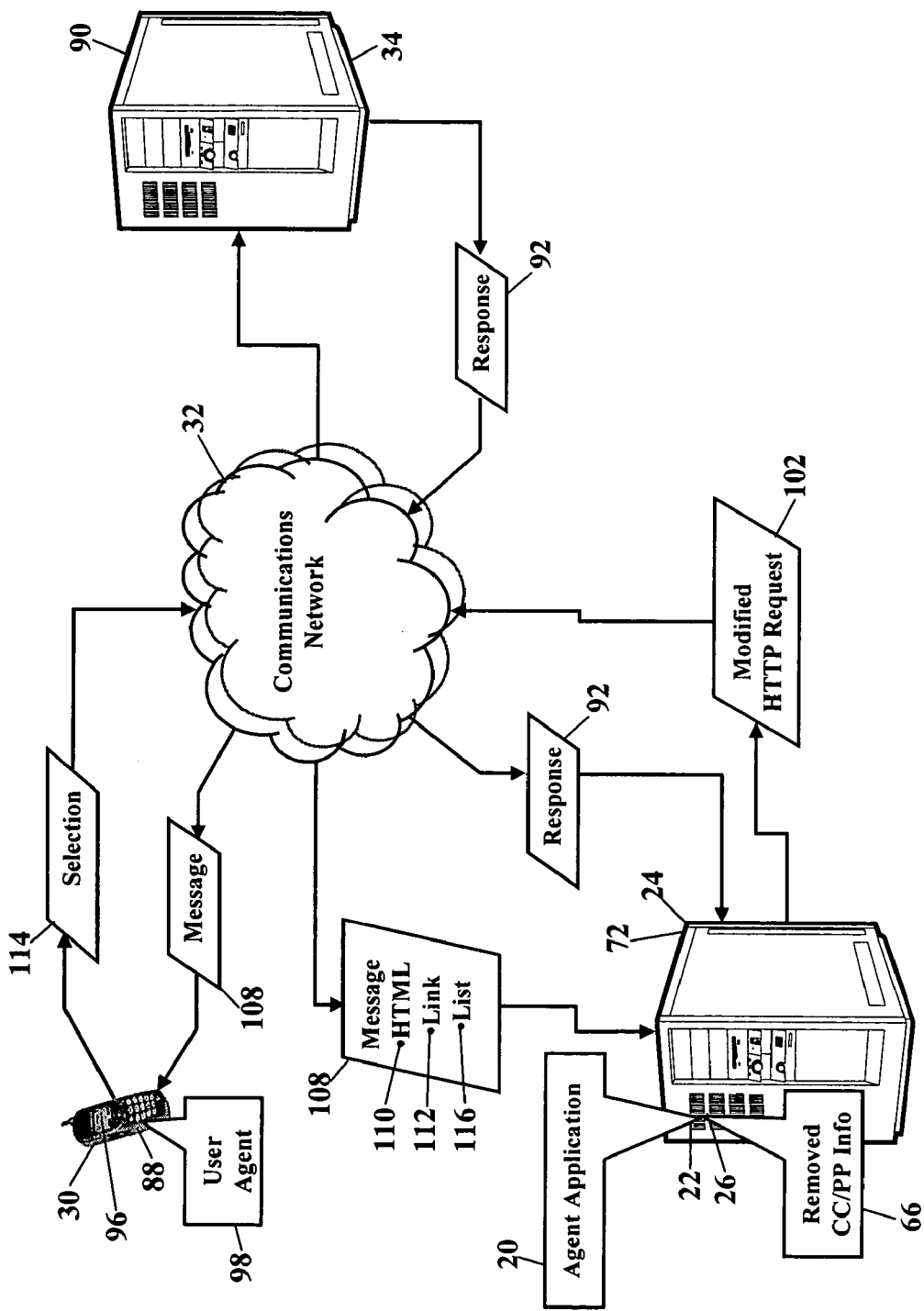
FIG. 14 is a schematic illustrating a suggestion of profiles, according to still more exemplary embodiments of the present invention.

FIG. 14 is a schematic illustrating a suggestion of profiles, according to still more exemplary embodiments of the present invention. Here, when the destination 34 (e.g., the web server 90) declines or fails to adapt the requested content, the agent application 20 may suggest another profile. The web server 90, as explained with reference to FIG. 11, may return the response 92, indicating the requested content was not adapted. The agent application 20 examines the response 92 and thus knows whether or not the web server 90 tailored the requested content. When the web server 90 fails to adapt the requested content, the agent application 20 may suggest one ore more alternate profiles. These alternate profiles may be suggested for any reason, such as resolving profile incompatibilities when the user at the communications device 30 cannot view content.

FIG. 14, then, illustrates this suggestion process. The agent application 20 examines the response 92 and thus knows the web server 90 failed to tailor the requested content. The agent application 20 generates a message 108 and sends the message 108 to the requesting communications device 30. The message 108 communicates via the communications network 32. The message 108 contains any type of information, data, or content that suggests alternate profiles. FIG. 14, for example, illustrates the message 108 as an HTML page 110 that contains links 112 to the alternative profiles. The communications device 30 processes the message 108 and visually and/or audibly presents the links 112 to the user. The user of the communications device 30 may then select one or more of the links 112, and that selection 114 is communicated back to the computer 24. When the computer 24 receives the user's selection 114, the agent application 20 instructs the processor 26 to recreate the condensed HTTP request using the user's selected profile. The agent application 20, then, sends the modified HTTP request 102 to the web server 90. If the web server 90 adapts the requested content, then the user's selected profile was successful. If, however, the web server 90 still fails to adapt the requested content, the agent application 20 will retry with another suggested profile. The agent application 20 could thus repeat this suggestion process until the web server 90 adapts the requested content according to the user's selected profile. The agent application 20, however, could be configured to limit the number of suggestions to conserve bandwidth and to reduce wait times.

Alternate profiles could be automatically selected. While the user may select one or more of the links 112 to another profile, the user agent 98 may autonomously make that selection on behalf of the user. The message 108 may contain a list 116 of alternate profile candidates, and the user agent 98 may select which profile to retry. The user agent 98 may use any hardware criteria, software criteria, or other criteria to select the alternate profile. The agent application 20 may even preemptively start the suggestion process. The agent application 20 may also facilitate the suggestion process between the user agent 98 and the web server 90.

The agent application 20 may already know acceptable profiles. The agent application 20 may have a priori knowledge of which profiles are accepted by the destination 34 (e.g., the web server 90). The agent application 20, for example, may store and track which profiles were previously accepted by the web server 90. The agent application 20 may maintain a historical log of acceptable profiles. The agent application 20 could alternatively or additionally query the web server 90 for a list of acceptable profiles, or the agent application 20 may query the web server 90 with various profiles to determine which profiles are acceptable. The agent application 20 may additionally probe or alternatively send an HTTP request to the web server 90 with a specific profile. The agent application 20 need not perform this request on behalf of any particular user—the agent application 20 sends this request to determine which profiles the destination 30 (e.g., the web server 90) successfully adapted content.

Figure 15:
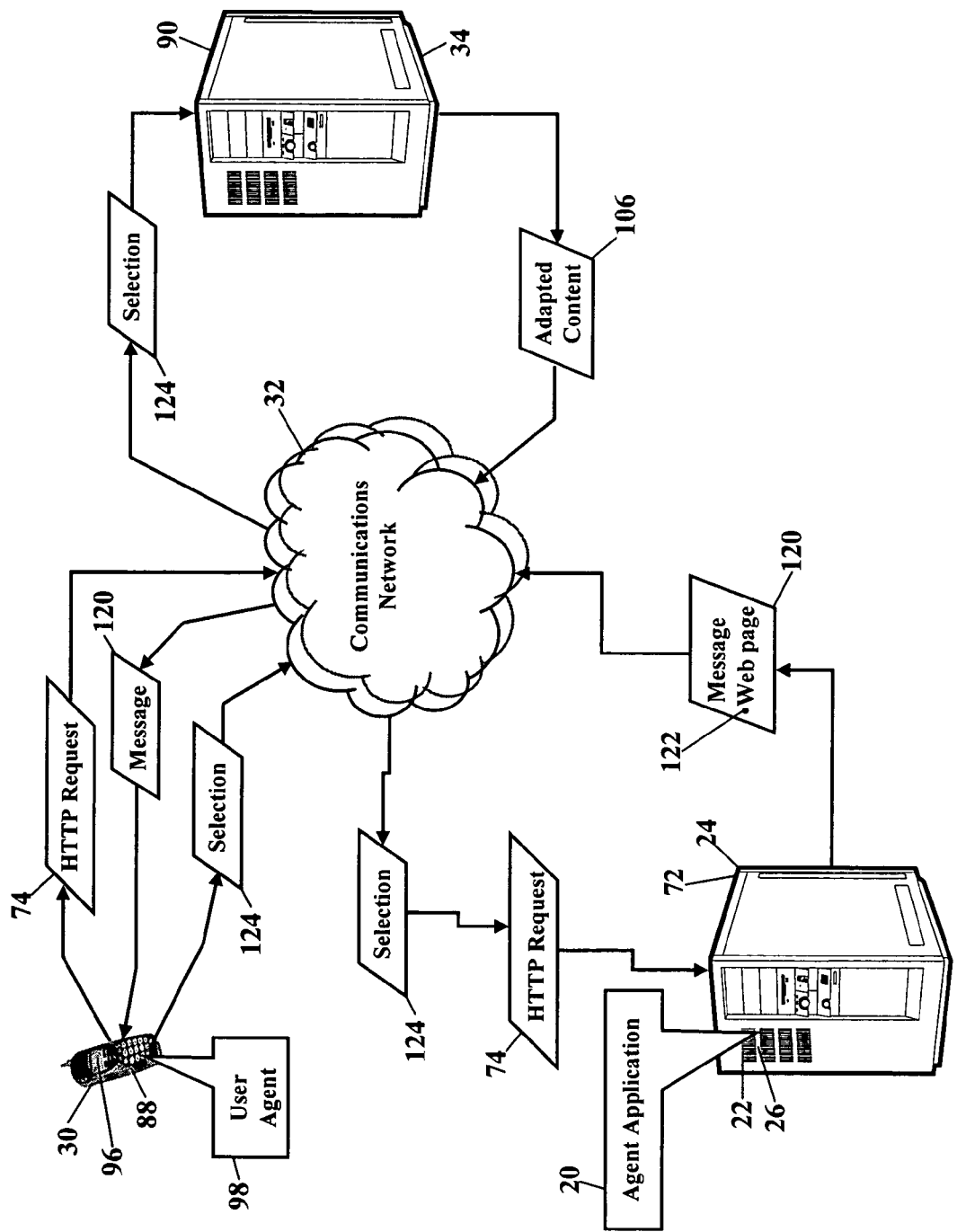
FIG. 15 is a schematic illustrating creation of profiles, according to the present invention.

FIG. 15 is a schematic illustrating creation of profiles, according to the present invention. Here the agent application 20 facilitates a process through which profiles are built or created to adapt content. The destination 34 (e.g., the web server 90), for example, may require a particular profile, but that particular profile is unavailable or the communication device's profile is invalid. FIG. 15, then, illustrates how the agent application 20 may initiate a profile building process. The agent application 20, for example, may host, call, or invoke a web-based application 118 that guides the user (at the communications device 30) through this profile-creation process. The web-based application 118 may be stored at the computer 24, may be stored at the destination 34, or may be client-side stored and executed (e.g., at the user's communications device 30).

FIG. 15, then, illustrates this process of creating profiles. When the computer 24 receives the HTTP request 74 from the communications device 30, the agent application 20 may first inspect the HTTP request 74. If the agent application 20 detects an invalid or non-existing profile, the agent application 20 may respond with a message 120. The message 120 communicates back to the communications device 30 and informs the user of the invalid or non-existing profile. While the message 120 may have any information, data, and/or formatting, the message 120 is illustrated as including one or more web pages 122. These web pages 122 (perhaps HTML pages) allow the user to enter or select appropriate settings. These settings, for example, may alter or affect a web site in general or a specific piece of content. When, for example, the user (at the communications device 30) requests a video, the user may be shown an HTML form of the video with two input fields. One input field, for example, accepts an input for width, while a second input field accepts another input for height. The user, then, enters the appropriate data for the communications device 30. The user's selection 124 is communicated to the agent application 20, and the agent application 20 may modify the original HTTP request 74 according to the selection 124. The user's selection 124 may additionally or alternatively communicate to the destination 34, where the destination 34 (e.g., the web server 90) accepts those selections as the user's profile for display size.

Another embodiment may be utilize without keyboards or keypads. When the agent application 20 detects an invalid or non-existing profile, the agent application 20 return sends the message 120. The message 120 may again include the one or more web pages 122 (e.g., HTML pages). The one or more web pages 122 may include one or more links. When the communications device 30 processes the one or more web pages 122, the links may be visually arranged in a grid on the display device 96. The user is instructed to click a link that appears in a lower right corner of the grid. The user's grid selection is communicated back to the agent application 20 and/or to the destination 34. When the grid selection is received (by either the agent application 20 and/or the destination 34), the width and height of the display device 96 may be calculated. The width and height are calculated based on the font size and the distance from the selected link to an upper left portion of the web page.

Figure 16:
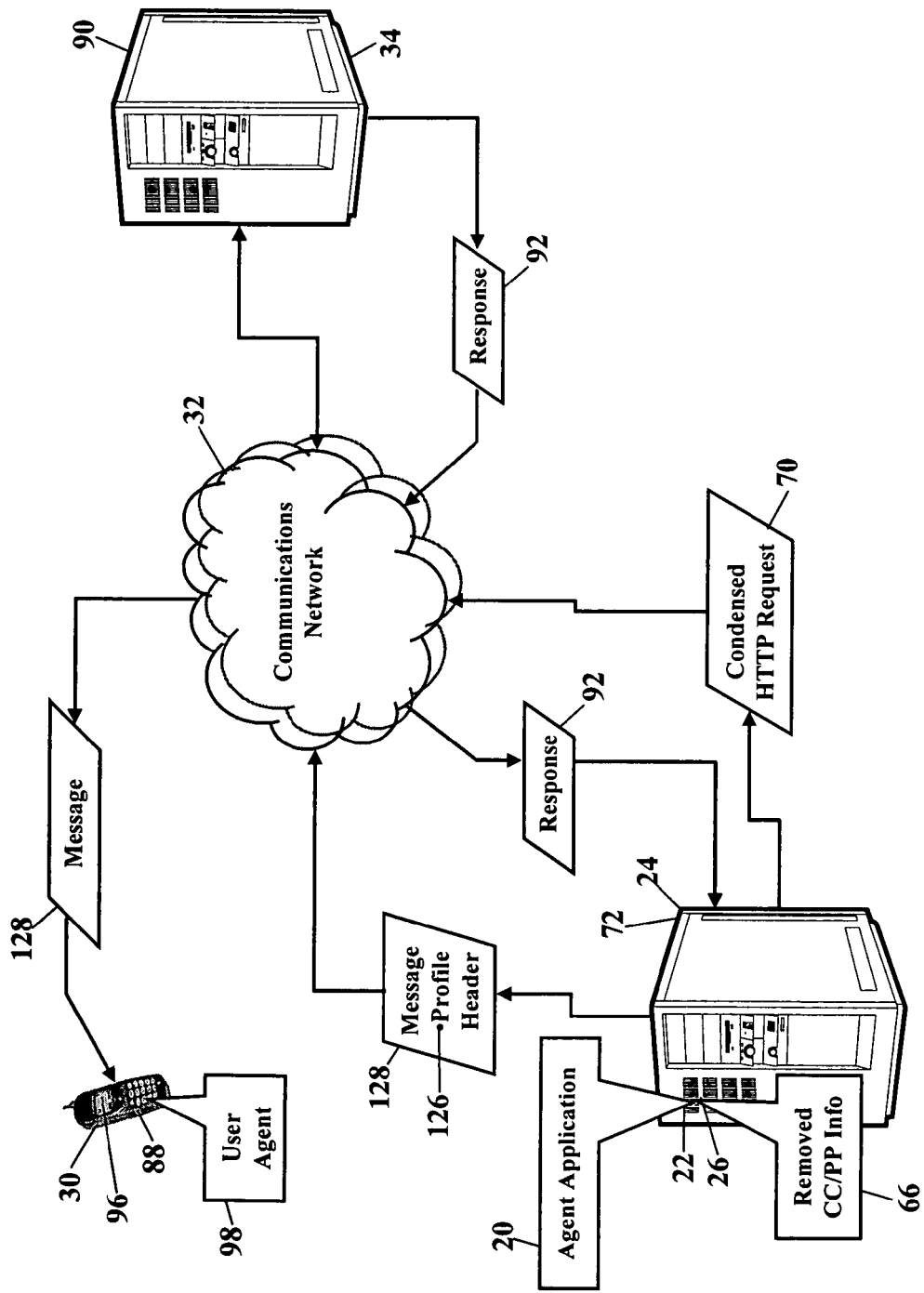
FIGS. 16 and 17 are schematics illustrating more non-session approaches utilizing the present invention.
Figure 17:
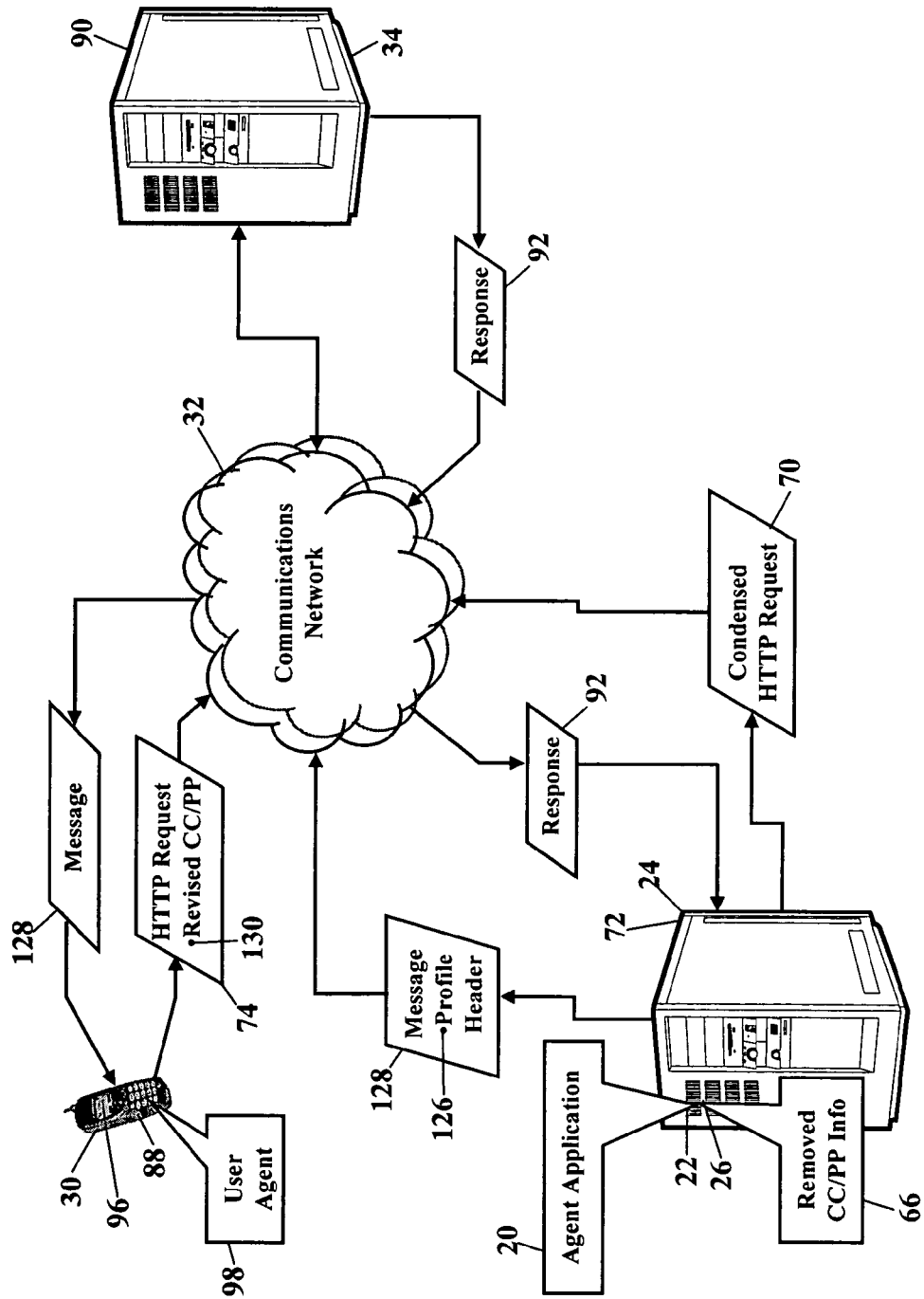

FIGS. 16 and 17 are schematics illustrating more non-session approaches utilizing the present invention. Here, when content is successfully adapted, the agent application 20 shares successful header information. As FIG. 16 illustrates, when the agent application 20 receives the response 92 from the web server 90, the response 92 indicates that the content adaptation is successful (or unsuccessful). Because the agent application 20 created and optimized the condensed HTTP request 70, the agent application 20 knows what optimized header information is successful (or unsuccessful). When the response 92 indicates that the requested content was successfully adapted, the agent application 20 retrieves the successful profile header 126 from memory. The agent application 20 then sends the successful profile header 126 in a message 128 to the communications device 30. Because the web server 90 successfully adapted the requested content, the agent application 20 passes along the profile header 126 used in that successful adaptation. The user agent 98 may then use that same profile header 126 for future requests. Additionally, those future requests need not include the entire CC/PP information (shown as reference numeral 64 in FIGS. 6-13). Those future requests need only include the successful profile header 126.

FIG. 17 illustrates responsive changes to the user agent 98. When the user agent 98 changes, the HTTP request 74 from the communications device 30 includes revised CC/PP information 130. The agent application 20 condenses the revised CC/PP information 130 (as above described) and sends the condensed HTTP request 70 to the destination 34 (e.g. the web server 90). If the web server 90 successfully adapts the requested content, the agent application 20 receives the successful response 92. The agent application 20 again return sends the successful profile header 126 in the message 128 to the communications device 30. The agent application 20 again passes along the profile header 126 used in that successful adaptation.

Figure 18:
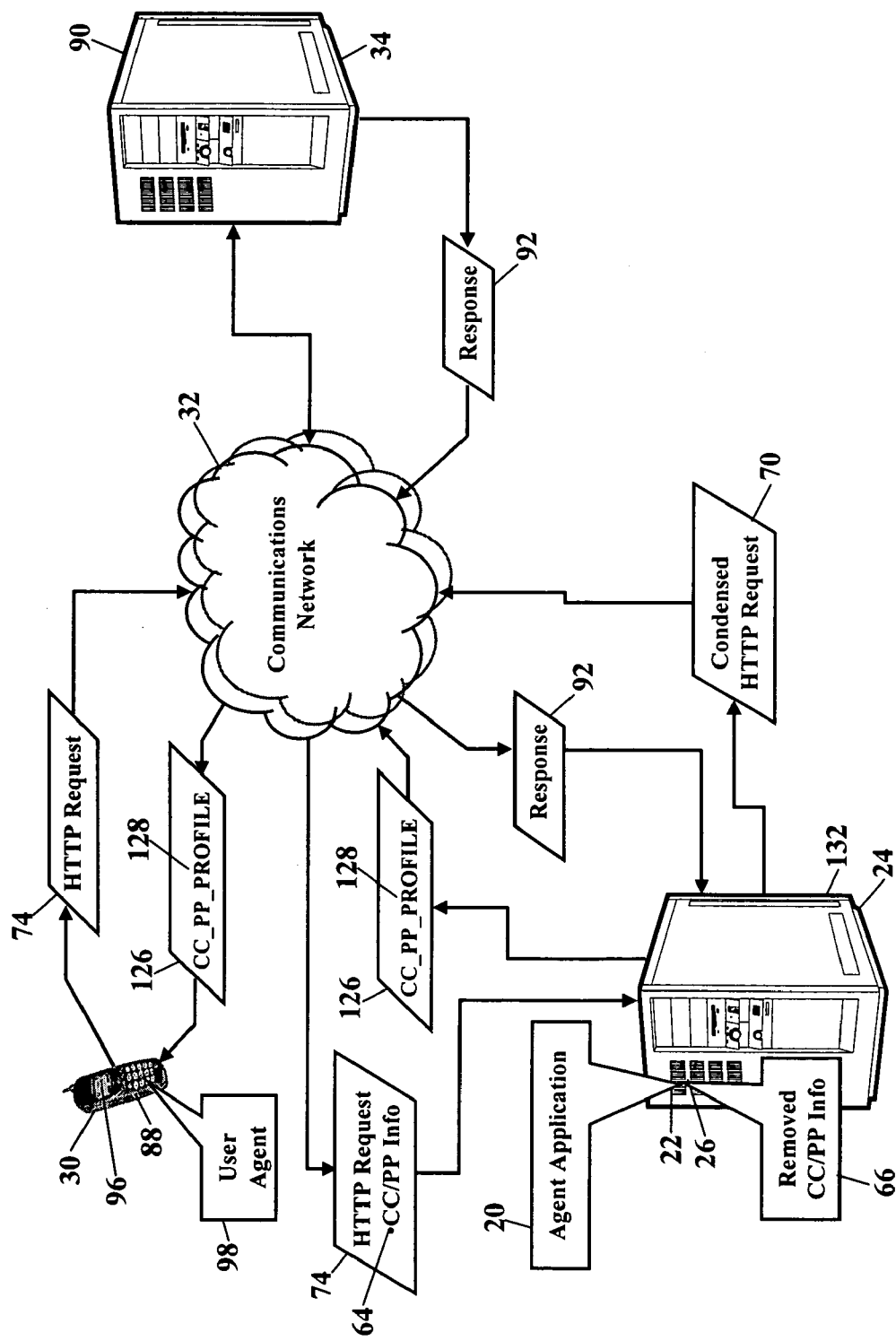
FIGS. 18-22 are schematics further illustrating the condensing of a message, according to the present invention.

FIGS. 18-22 are schematics further illustrating the condensing of a message, according to the present invention. As FIG. 18 illustrates, here the computer 24 is a wireless access point 132, such that the agent application 20 stores within the memory 22 of the wireless access point 132. The communications device 30 establishes a session with the wireless access point 132. The user agent 98 sends the HTTP request 74 to the wireless access point 132. The HTTP request 74 may include one or more profile headers and profile difference headers, as is known. The agent application 20 then condenses and produces the condensed HTTP request 70. The agent application 20 then forwards the condensed HTTP request 70 to the destination 34, as above explained. The agent application 20 receives the response 92 and sends the message 126 to the user agent 98. The agent application 20 again return sends the successful profile header 128 ("CC_PP_PROFILE") in the message 126 to the communications device 30. The agent application 20, in other words, informs the user agent 98 of the optimized profile information accepted by the destination 34.

Figure 19:
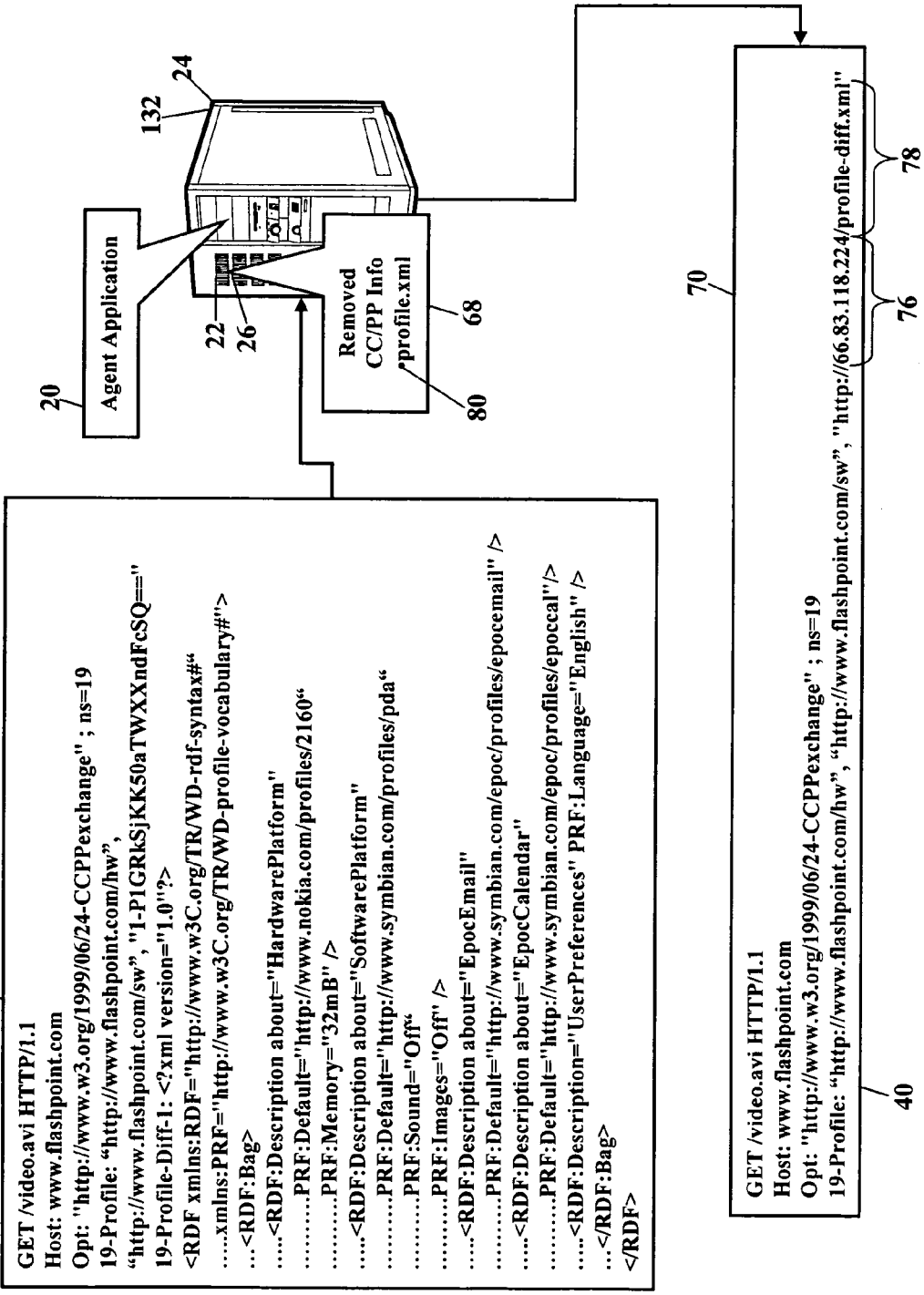

FIG. 19 illustrates the condensed HTTP request 70. FIG. 19 illustrates the wireless access point 132 receiving the following decoded HTTP request 70.

GET /video.avi HTTP/1.1
Host: www.flashpoint.com
Opt: "http://www.w3.org/1999/06/24-CCPPexchange" ; ns=19
19-Profile: "http://www.flashpoint.com/hw",
"http://www.flashpoint.com/sw", "1-P1GRkSjKK50aTWXXndFcSQ=="
19-Profile-Diff-1: <?xml version="1.0"?>
<RDF xmlns:RDF="http://www.w3C.org/TR/WD-rdf-syntax#"
     xmlns:PRF="http://www.w3C.org/TR/WD-profile-vocabulary#">
  <RDF:Bag>
    <RDF:Description about="HardwarePlatform"
       PRF:Default="http://www.nokia.com/profiles/2160"

-continued

```
    PRF:Memory="32mB" />
    <RDF:Description about="SoftwarePlatform"
    PRF:Default="http://www.symbian.com/profiles/pda"
    PRF:Sound="Off"
    PRF:Images="Off"/>
    <RDF:Description about="EpocEmail"
    PRF:Default="http://www.symbian.com/epoc/profiles/
    epocemail"/>
  <RDF:Description about="EpocCalendar"
    PRF:Default="http://www.symbian.com/epoc/profiles/epoccal"/>
    <RDF:Description="UserPreferences" PRF:Language=
"English"/>
  </RDF:Bag>
</RDF>
```

The agent application 20 collapses that verbose HTTP request 74 into the following condensed HTTP request 70.

```
GET /video.avi HTTP/1.1
Host: www.flashpoint.com
Opt: "http://www.w3.org/1999/06/24-CCPPexchange" ; ns=19
19-Profile: "http://www.flashpoint.com/hw",
"http://www.flashpoint.com/sw",
"http://66.83.118.224/profile-diff.xml"
```

The Internet Protocol address 76 ("66.83.118.224") represents the wireless access point 132. The file 80 ("profile-diff.xml") represents the removed CC/PP information 68. The reader should know that the above example represents the decoded representations of the HTTP request 70 and the condensed HTTP request 70. Remember, the communications device (shown as reference numeral 30) sends and receives messages using wireless session protocol. This wireless session protocol has an encoded binary format. The examples herein represent the decoded representations of the wireless session protocol.

Figure 20:
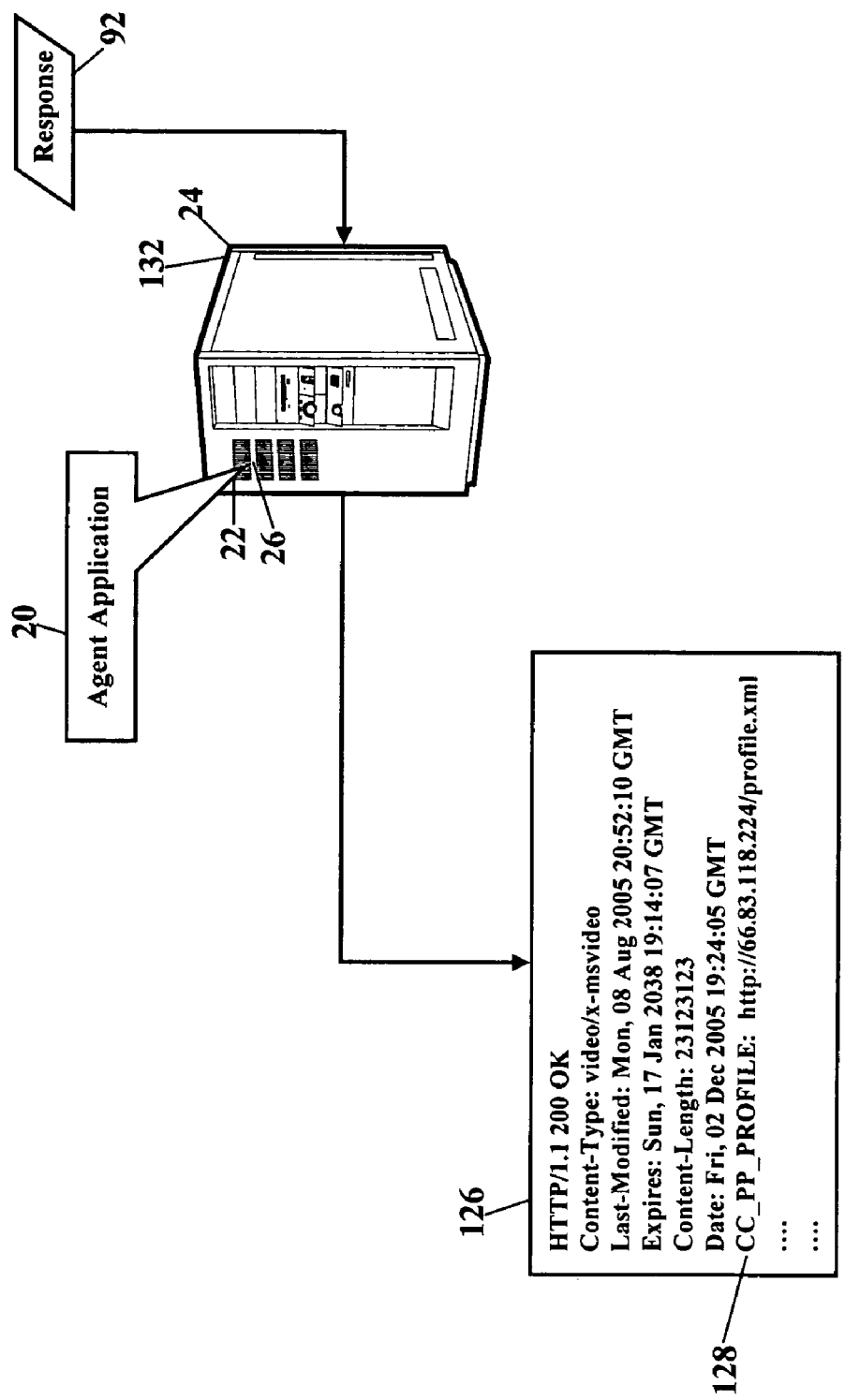

FIG. 20 illustrates the message 126. As FIG. 19 illustrated, the agent application 20 then forwards the condensed HTTP request 70 to the destination 34. The agent application 20 then receives the response 92 and sends the message 126 to the user agent 98. The agent application 20 returns the successful profile header 128 ("CC_PP_PROFILE") in the message 126 to the user agent 98. The agent application 20 thus informs the user agent 98 of the profile information accepted by the destination 34. FIG. 20 then, illustrates the wireless access point 132 communicating the following decoded message 126 to the communications device 30. Again, the message 126 represents the decoded version of the wireless session protocol format.

```
HTTP/1.1 200 OK
Content-Type: video/x-msvideo
Last-Modified: Mon, 08 Aug 2005 20:52:10 GMT
Expires: Sun, 17 Jan 2038 19:14:07 GMT
Content-Length: 23123123
Date: Fri, 02 Dec 2005 19:24:05 GMT
CC_PP_PROFILE: http://66.83.118.224/profile.xml
...
...
```

An alternative embodiment hands a result to the wireless access point 132. The agent application 20 may first receive decoded message 126. The agent application 20 may then send the message 126 to the wireless access point 132. In other words, the wireless access point 132 has two components—the agent application 20 and the conventional WAP componentry. When the communication device 30 sends a request to the wireless access point 132, the communications device 30 communicates with the conventional WAP component. When the conventional WAP componentry sends an HTTP request, the conventional WAP componentry hands the request to the agent application 20 for HTTP formatting. Likewise, when an HTTP response is received (perhaps via the Internet), the response is first processed by agent application 20, and then the agent application 20 hands it to the conventional WAP componentry.

Figure 21:
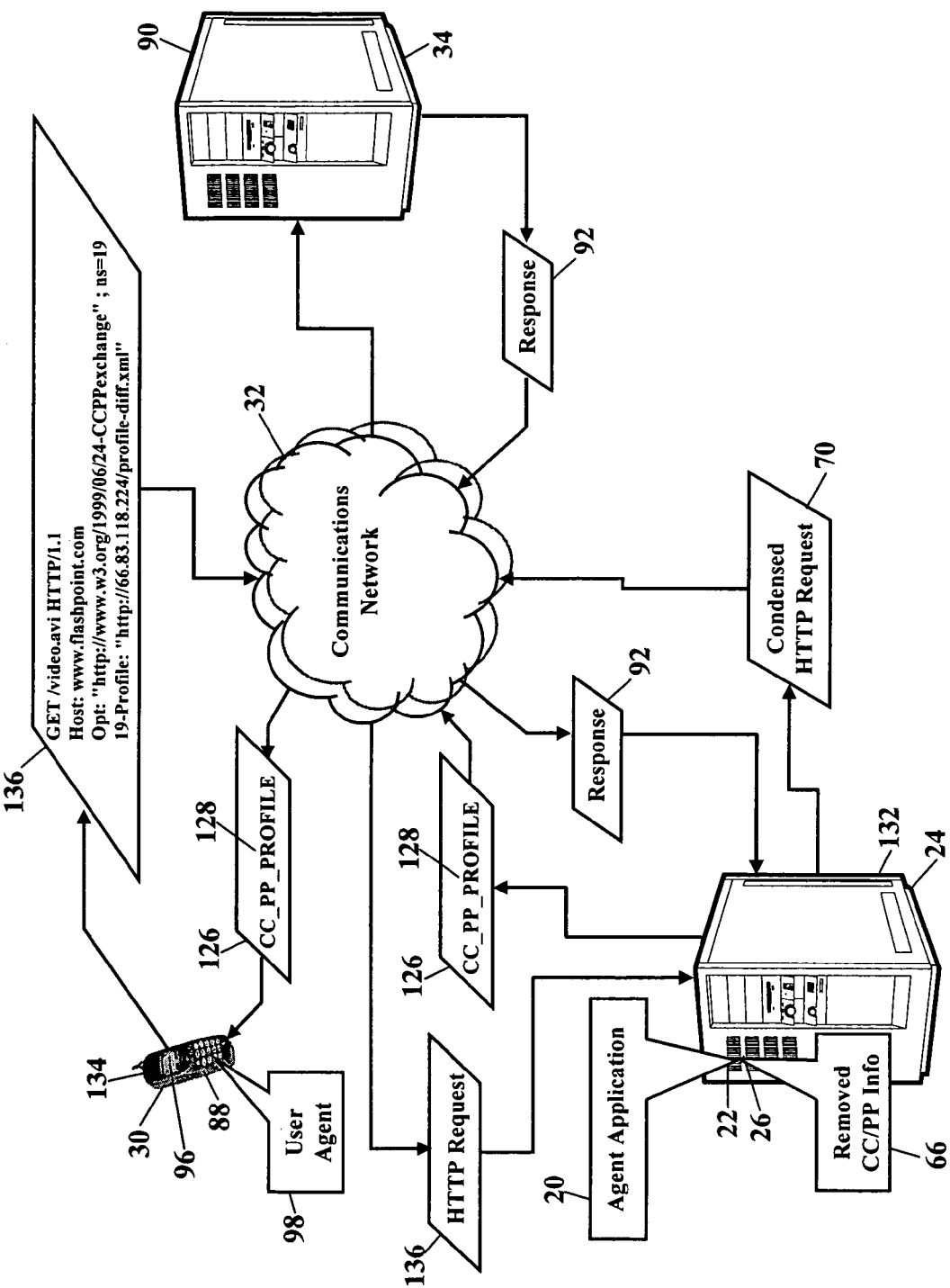

FIG. 21 illustrates the successful profile header 128. When the wireless access point 132 receives the response 92, the agent application sends the message 126. When the communications device 30 (e.g., the cellular phone 88) receives the message 126, a processor 134 in the communications device 30 associates the successful profile header 128 ("CC_PP_PROFILE") to the profile information used with the request. When the user agent 98 issues a new HTTP request 136, the user agent 98 uses the successful profile header 128 ("CC_PP_PROFILE") in the new HTTP request 136.

```
GET /video.avi HTTP/1.1
Host: www.flashpoint.com
Opt: "http://www.w3.org/1999/06/24-CCPPexchange" ; ns=19
19-Profile: "http://66.83.118.224/profile-diff.xml"
```

Should the profile information then change, the communications device 30 sends the new profile information and associates a new successful profile header (as FIG. 16 explained). If the communications device 30 frequently changes its profile information, the user agent 98 would first determine whether the current profile already has an associated successful profile header. (A session-based approach, on the other hand, would repeatedly send each change in profile information.)

The wireless access point 132 receives the new HTTP request 136. The agent application 20 detects that the new HTTP request 136 contains a profile reference in the profile header. The wireless access point 132 notices the profile reference's IP address ("66.83.118.224") is associated with itself, so the agent application 20 queries the memory 22. If the profile filename ("profile.xml") exists in the memory 22, the agent application 20 does nothing to the new HTTP request 136 and sends it to the destination 34 (e.g., the web server 90).

Figure 22:
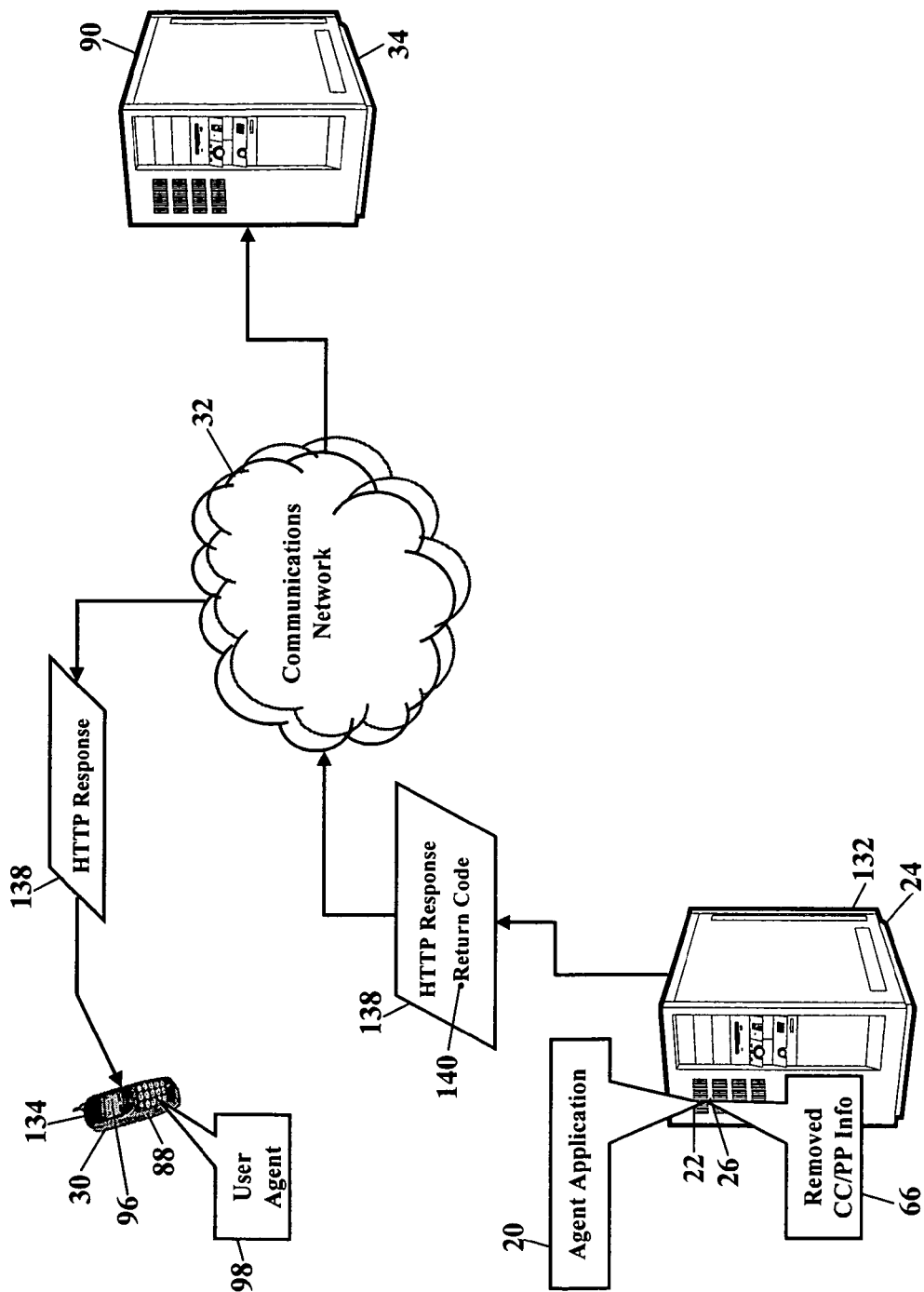

FIG. 22 illustrates an HTTP response 138. When the profile filename does not exist in the memory 22, the agent application 20 sends a return code 140 in the HTTP response 138 to the communications device 30. The code 140 indicates that the referenced profile no longer exists, so a second new HTTP request should be sent. This second new HTTP request should include the profile header and the profile difference headers identified in the HTTP response 138.

Figure 23:
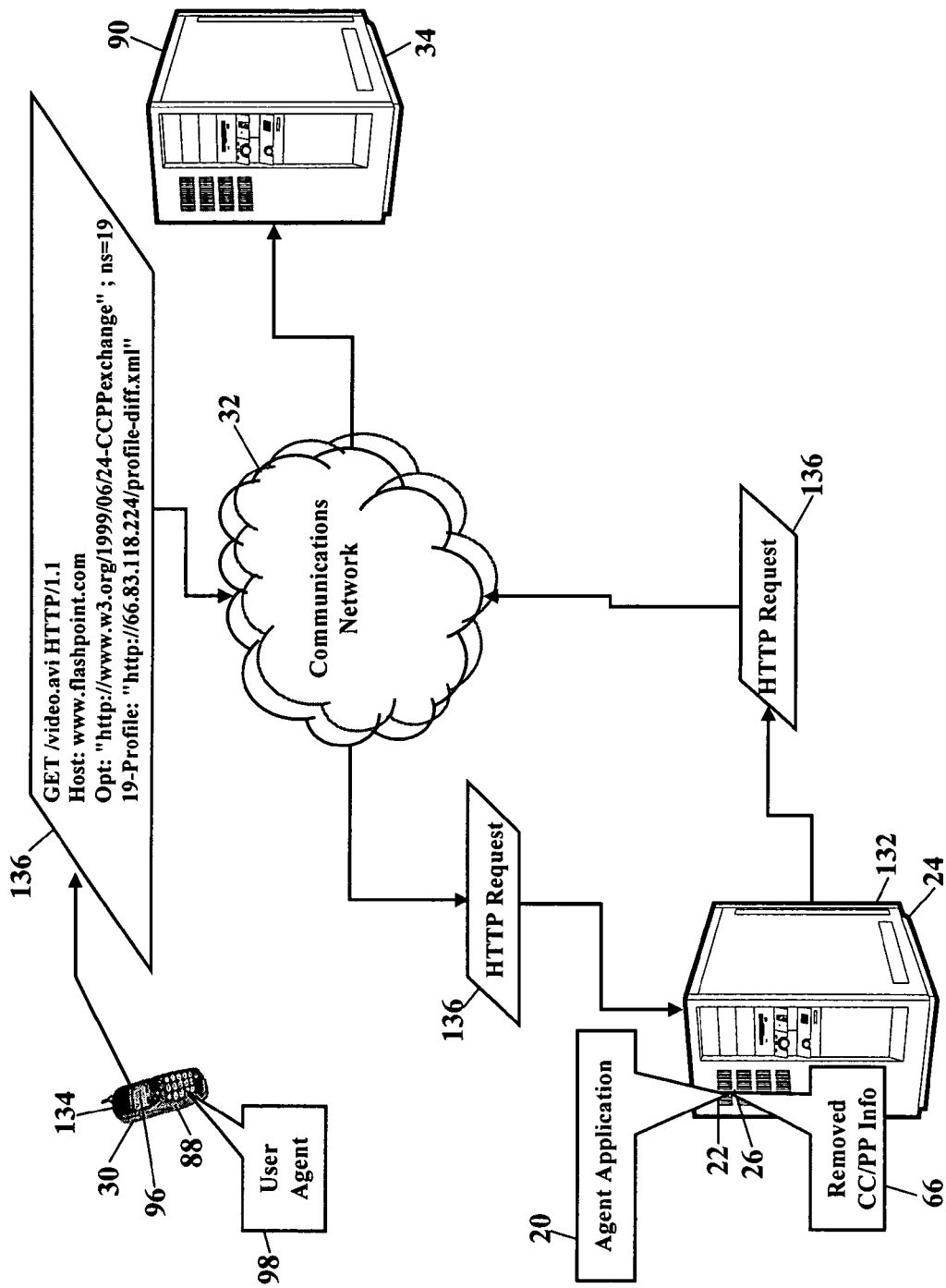
FIG. 23 is another schematic illustrating the condensing of a message, according to the present invention.

FIG. 23 is another schematic illustrating the condensing of a message, according to the present invention. Because FIGS. 21 and 23 are similar, FIG. 23 is only briefly described. When the wireless access point 132 receives the new HTTP request 136, the agent application 20 detects that the new HTTP request 136 contains the profile reference in the profile header ("http://66.83.118.224/profile-diff.xml"). Here, however, the agent application 20 skips a query of the memory 22. That is, the agent application 20 does not query to determine whether the profile ("profile-diff.xml") exists in the memory 22. Here the agent application 20 simply forwards the new HTTP request 136 to the destination 34. When the destination 34 attempts to fetch the referenced profile ("profile-diff.xml"), the wireless access point 132 may, or may not, have stored the profile. (Remember, in this example, no query was performed to confirm that the memory 22 stores the profile.) If the agent application 20 cannot retrieve and return the referenced profile ("profile-diff.xml"), the agent application 20 may retrieve the referenced profile from the communications device 30 or from some other remote location. The agent application 20, alternatively, may forward the new HTTP request 136 to the destination 34 and, on another thread, check if the referenced profile exists. If the referenced profile ("profile-diff.xml") does not exist, the agent application 20 may fetch that profile in a separate thread and store it before the destination 34 requests it.

The present invention, then, is different from session based approaches. Session based approaches (such as the Wireless Application Group's User Agent Profile Specification) (or UAProf) store profile information in a session. In UAProf, a client device communicates profile information when it creates a session to a WAP gateway. The client device then does not have to send profile information when issuing a HTTP request. However, the gateway is responsible for storing the profile and injecting the profile into client HTTP requests. A WAP gateway must also accommodate suspension and resumption of a WSP session. Basically the WAP gateway may have to maintain a long term session, thus caching profiles for a long time. There may be hundreds, thousands, even millions of devices communicating via the WAP gateway and the gateway must maintain profile information for each device. If the reader desires more information on session-based approaches, the reader is invited to consult the Wireless Application Group's User Agent Profile Specification, available from available from the Open Mobile Alliance, 4275 Executive Square, Suite 240, La Jolla, Calif. USA 92037, and incorporated herein by reference.

The present invention, however, is a session-less approach. The WAP gateway no longer is required to store profile information in each session it maintains. The WAP gateway, however, will store profile information (or delegate the storage to a remote location) but the profile is session agnostic. More specifically, when the communication device detects a successful profile (such as the profile header "CC_PP_PROFILE" illustrated in FIGS. 18, 20, and 21) it will use the successful profile header on all subsequent HTTP requests. When the WAP gateway receives a HTTP using an optimized profile, the WAP gateway needs to do little processing work. What processing work that must be done may be performed in a separate thread so as to streamline the user's requesting thread. The agent application 20, if given a profile and profile differences (e.g., "Profile-Diffs"), the agent application 20 may detect an existing, optimized profile to reference and, therefore, need not create and store a new profile. Because the present invention is session-less, a multitude of communications devices may reference the same profile. The user's communications device 30 may even simultaneously utilize more than one profile in the same session. The session based approach, however, may cause a thrashing between profiles. The wireless access point 132 is even freer to adjust its resources. The wireless access point 132, for example, may remove some profiles to free memory space. The wireless access point 132 may also pre-fetch popular profiles perhaps from a third-party). Additionally, as wireless devices become homogenized, the wireless access point 132 may only require a small number of profiles. Because some manufacturers and their devices capture a significant portion of the wireless market, a relatively homogenous set of profiles may serve a great number of devices. The session-less wireless access point 132, then, need not acquire a large number of profiles. The session approach cannot take advantage of this homogeneity. Moreover, the session-less wireless access point 132 may itself perform the optimizations described herein, or the session-less wireless access point 132 may delegate the optimization work to another device. A hybrid concept could have the wireless access point 132 perform the optimization work, yet, delegate storage of the optimized profiles to another device or location via the communications network 32.

Peer devices may also be used to obtain profiles. The user's communications device 30 could wirelessly communicate with peer devices via the communications network 32. The communications device 30 could query a peer device for an acceptable profile. If the communications device 30, for example, has BLUETOOTH® capability, the communications device 30 could query another device for profiles. The communications device 30 could query for that peer device's "CC_PP_PROFILE" (as illustrated in FIGS. 18, 20, and 21). The communications device 30 may then communicate with the wireless access point 132 using a CC_PP_PROFILE value gathered from a nearby peer device.

As the communications device 30 roves to a new wireless access point, profiles may be reused. When the communications device 30 moves between wireless access points, the user agent 98 may continue using the same CC_PP_PROFILE value. The referenced profile is already optimized, so the new wireless access point cannot further condense the CC/PP information. The new wireless access point may simply pass the profile header value with each HTTP request, with no action required. The new wireless access point may optionally recognize the optimized profile header and fetch the profile from the original wireless access point hosting it and store the profile itself. The new wireless access point thereby ensures that the profile is locally available.

Figure 24:
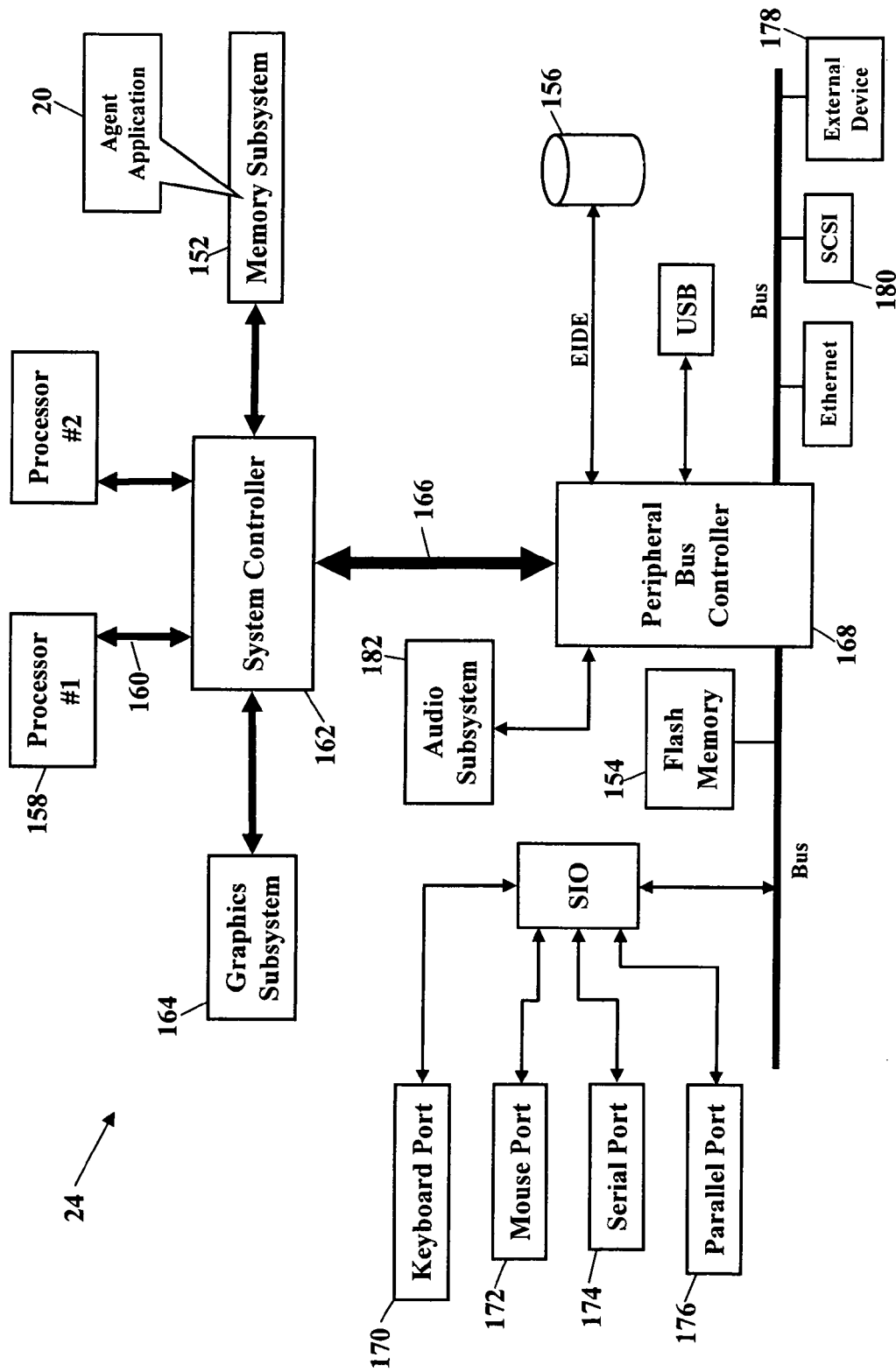
FIG. 24 is a block diagram showing an alternative operating environment, according to the present invention.

FIG. 24 depicts another possible operating environment for the exemplary embodiments. FIG. 24 is a block diagram showing the agent application 20 residing in the computer 24 (such as the proxy server 72 and the wireless access point 132). FIG. 24, however, may also represent a block diagram of any computer, communications device, or processor-controlled device. The agent application 20 operates within a system memory device. The agent application 20, for example, is shown residing in a memory subsystem 152. The agent application 20, however, could also reside in flash memory 154 or peripheral storage device 156. The computer system 24 also has one or more central processors 158 executing an operating system. The operating system, as is well known, has a set of instructions that control the internal functions of the computer system 24. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, IL 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the computer system 24.

Figure 25:
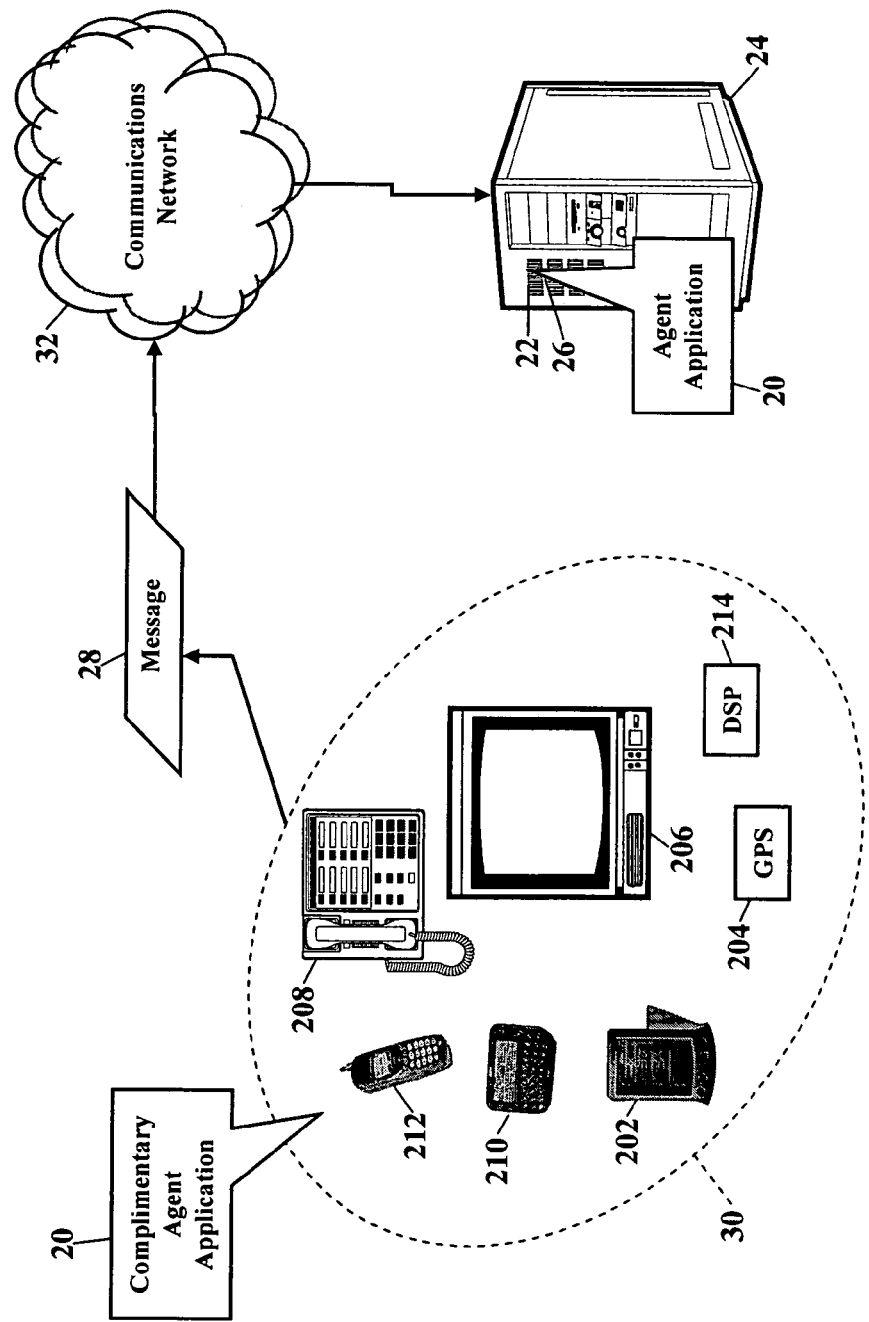
FIG. 25 is a schematic illustrating more alternative operating environments for the present invention.

FIG. 25 is a schematic illustrating various communications devices 30 that may interface with the agent application 20, according to the present invention. The agent application 20 is again stored within the memory 22 of the computer 24, and the processor 26 executes the agent application 20. Here, however, the communications device 30 may additionally store and execute a complimentary agent application 200. The complimentary agent application 200 interfaces with or cooperates with the agent application 20 stored in the computer 24. FIG. 25, for example, illustrates that the agent application 20 may entirely or partially operate within a personal digital assistant (PDA) 202, a Global Positioning System (GPS) device 204, an interactive television 206, an Internet Protocol (IP) phone 208, a pager 210, a cellular/satellite phone 212, or any computer system and/or communications device utilizing a digital signal processor (DSP) 214. The communications device 30 may also include watches, radios, vehicle electronics, clocks, printers, gateways, and other apparatuses and systems.

Moreover, the exemplary embodiments may be applied regardless of networking environment. The communications network 32 may be a cable network operating in the radio-frequency domain and/or the Internet Protocol (IP) domain. The communications network 32, however, may also include a distributed computing network, such as the Internet (sometimes alternatively known as the "World Wide Web"), an intranet, a local-area network (LAN), and/or a wide-area network (WAN). The communications network 32 may include coaxial cables, copper wires, fiber optic lines, and/or hybrid-coaxial lines. The communications network 32 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

The agent application (shown as reference numeral 20 in FIGS. 1-15) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the agent application to be easily disseminated. A computer program product comprises the agent application stored on the computer-readable medium. The agent application comprises computer-readable instructions/code for accessing files, as hereinabove explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for condensing a header comprising:

receiving a message directed to a server from a source device, the message including:

a) a first reference to a first location on a first storage device of a composite capabilities/preference profiles (CC/PP) profile device portion; and b) a CC/PP profile difference portion describing characteristics of the source device that originated the message;

obtaining the CC/PP profile device portion from the first location on the first storage device;

combining the CC/PP profile device portion with the CC/PP profile difference portion to form a combined CC/PP profile;

storing the combined CC/PP profile at a second location on a second storage device, wherein the second storage device is not the first storage device;

replacing the CC/PP profile difference portion and the CC/PP profile device portion in the message with a reference to the second location; and sending the message to the server.

2. The method of claim 1 further comprising:
receiving a request for the combined CC/PP profile from the server;
obtaining the combined CC/PP profile from the second location; and
sending the combined CC/PP profile to the server in response to the request.

3. The method of claim 2 wherein sending the combined CC/PP profile to the server further comprises sending the combined CC/PP profile and time data indicating a modification time associated with the combined CC/PP profile.

4. The method of claim 1, wherein the reference to the second location comprises a URI identifying the second location.

5. A system, comprising:
an agent application stored in memory; and
a processor communicating with the memory,
the processor receiving a message directed to a server from a source device, the message including:
a) a first reference to a first location on a first storage device of a composite capabilities/preference profiles (CC/PP) profile device portion; and
b) a CC/PP profile difference portion describing characteristics of the source device that originated the message;
the processor obtaining the CC/PP profile device portion from the first location on the first storage device;
the processor combining the CC/PP profile device portion with the CC/PP profile difference portion to form a combined CC/PP profile;
the processor storing the combined CC/PP profile at a second location on a second storage device, wherein the second storage device is not the first storage device;
the processor replacing the CC/PP profile difference portion and the CC/PP profile device portion in the message with a reference to the second location; and
the processor sending the message to the server.

6. The system of claim 5 further comprising:
the processor receiving a request for the combined CC/PP profile from the server;
the processor obtaining the combined CC/PP profile from the second location; and
the processor sending the combined CC/PP profile to the server in response to the request.

7. The system of claim 6 wherein the processor sending the combined CC/PP profile to the server further comprises the processor sending the combined CC/PP profile and time data indicating a modification time associated with the combined CC/PP profile.

8. The system of claim 5, wherein the reference to the second location comprises a URI identifying the second location.

9. A computer program product comprising a non-transitory computer-readable medium storing instructions for performing the steps:
receiving a message directed to a server from a source device, the message including:
a) a first reference to a first location on a first storage device of a composite capabilities/preference profiles (CC/PP) profile device portion; and
b) a CC/PP profile difference portion describing characteristics of the source device that originated the message;
obtaining the CC/PP profile device portion from the first location on the first storage device;
combining the CC/PP profile device portion with the CC/PP profile difference portion to form a combined CC/PP profile;
storing the combined CC/PP profile at a second location on a second storage device, wherein the second storage device is not the first storage device;
replacing the CC/PP profile difference portion and the CC/PP profile device portion in the message with a reference to the second location; and
sending the message to the server.

10. The computer program product of claim 9 further comprising instructions for:
receiving a request for the combined CC/PP profile from the server;
obtaining the combined CC/PP profile from the second location; and
sending the combined CC/PP profile to the server in response to the request.

11. The computer program product of claim 10 wherein the instructions for sending the combined CC/PP profile to the server further comprises instructions for sending the combined CC/PP profile and time data indicating a modification time associated with the combined CC/PP profile.

12. The computer program product of claim 9, wherein the reference to the second location comprises a URI identifying the second location.

* * * * *